United States Patent
Nomura et al.

(10) Patent No.: US 8,180,552 B2
(45) Date of Patent: May 15, 2012

(54) VARIABLE VALVE TIMING APPARATUS AND CONTROL METHOD THEREOF

(75) Inventors: Mitsuhiro Nomura, Toyota (JP); Haruyuki Urushihata, Chiryu (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 826 days.

(21) Appl. No.: 12/304,017

(22) PCT Filed: Jun. 1, 2007

(86) PCT No.: PCT/JP2007/061595
§ 371 (c)(1),
(2), (4) Date: Dec. 9, 2008

(87) PCT Pub. No.: WO2007/142322
PCT Pub. Date: Dec. 13, 2007

(65) Prior Publication Data
US 2010/0235067 A1    Sep. 16, 2010

(30) Foreign Application Priority Data
Jun. 9, 2006  (JP) ................. 2006-160967

(51) Int. Cl.
*F02D 13/02*    (2006.01)
*F01L 1/34*    (2006.01)
*F02B 75/10*    (2006.01)
*F01L 1/344*    (2006.01)

(52) U.S. Cl. ...... 701/103; 701/112; 701/113; 123/90.15

(58) Field of Classification Search ............. 1/103, 104, 1/112, 113; 123/179.3, 179.4, 90.15, 90.16
See application file for complete search history.

(56) References Cited

U.S. PATENT DOCUMENTS

| | | | | |
|---|---|---|---|---|
| 5,957,095 | A | * | 9/1999 | Kako .................... 123/90.15 |
| 6,397,803 | B1 | * | 6/2002 | Fujiwara et al. ........ 123/90.15 |
| 6,474,291 | B2 | * | 11/2002 | Collins et al. .......... 123/198 DB |

(Continued)

FOREIGN PATENT DOCUMENTS

EP    1 178 184 A1    2/2002

(Continued)

OTHER PUBLICATIONS

Japanese Office Action for corresponding Japanese Patent Application No. 2006-160967 mailed Aug. 10, 2010, 5 pages.

*Primary Examiner* — Stephen K Cronin
*Assistant Examiner* — Arnold Castro
(74) *Attorney, Agent, or Firm* — Sughrue Mion, PLLC

(57) ABSTRACT

In valve timing control after issuance of an engine stop instruction with a prescribed value set as a target phase, an ECU delays permission of an engine stop process within a prescribed time period while an intake valve phase has not yet reached the target value, so that a valve timing control operation is continued while the engine operation is continued in an idle state. After the lapse of a prescribed time period from the issuance of the engine stop instruction, however, the ECU permits the engine stop process no matter whether the intake valve phase has reached the target value or not. As a result, the amount of valve timing that can be changed by the valve timing control in the engine stop operation can be increased, without causing any uncomfortable feeling of the driver.

17 Claims, 16 Drawing Sheets

U.S. PATENT DOCUMENTS

| | | |
|---|---|---|
| 6,505,586 B1 | 1/2003 | Sato et al. |
| 6,779,499 B2 | 8/2004 | Takenaka et al. |
| 7,159,545 B2 * | 1/2007 | Miyakoshi et al. ........ 123/90.15 |
| 7,159,555 B2 * | 1/2007 | Nohara et al. ........... 123/179.18 |
| 7,168,410 B2 * | 1/2007 | Kato et al. ............. 123/339.15 |
| 7,305,957 B2 * | 12/2007 | Mashiki ..................... 123/179.4 |
| 7,406,933 B2 | 8/2008 | Inoue et al. |
| 7,469,667 B2 * | 12/2008 | Leone et al. ............... 123/90.15 |
| 7,703,424 B2 * | 4/2010 | Nakamura et al. ......... 123/90.16 |
| 7,743,743 B2 * | 6/2010 | Inoue et al. ................ 123/90.17 |
| 2002/0134334 A1 | 9/2002 | Yamada et al. |
| 2005/0061271 A1 | 3/2005 | Pfeiffer et al. |
| 2005/0199200 A1 * | 9/2005 | Miyakoshi et al. ........ 123/90.17 |
| 2005/0235938 A1 | 10/2005 | Tani et al. |
| 2005/0279323 A1 * | 12/2005 | Lewis et al. .................... 123/321 |
| 2006/0102125 A1 * | 5/2006 | Mashiki ..................... 123/179.4 |

FOREIGN PATENT DOCUMENTS

| | | |
|---|---|---|
| JP | 2000-080939 A | 3/2000 |
| JP | 2002-357136 A | 12/2002 |
| JP | 2004-156508 A | 6/2004 |
| JP | 2005-264864 A | 9/2005 |
| JP | 2005-291200 A | 10/2005 |
| JP | 2007-262950 A | 10/2007 |

* cited by examiner

VARIABLE VALVE TIMING APPARATUS AND CONTROL METHOD THEREOF

TECHNICAL FIELD

The present invention relates to a variable valve timing apparatus and control method thereof. More specifically, the present invention relates to a variable valve timing apparatus having a mechanism of changing a valve opening/closing timing by an amount of change according to an operation amount of an actuator.

BACKGROUND ART

A VVT (Variable Valve Timing) has conventionally been known that changes the phase (crank angle) in (at) which an intake valve or an exhaust valve is opened/closed, according to an operating condition. Generally, in the variable valve timing apparatus, the phase is changed by rotating a camshaft, which opens/closes the intake valve or exhaust valve, relative to a sprocket or the like. The camshaft is rotated by an actuator such as a hydraulic or electric motor.

Such a variable valve timing is operated while the vehicle is driven, and sometimes it is operated even after an engine-stop instruction is issued by an off-operation of an ignition key, to change the valve timing (cam shaft phase). Specifically, when the valve timing at the time point when the engine-stop is instructed is different from the valve phase suitable for starting the engine next time, the valve timing is changed by the variable valve timing apparatus, to be ready for the next start of engine operation.

For example, Patent Document 1 (Japanese Patent Laying-Open No. 2004-156508) discloses a valve timing controller that changes the valve timing to attain an angular position suitable for the start of engine operation next time, by applying a current for a prescribed time period to a hysteresis brake as an electromagnetic actuator, after the ignition key is turned off. Patent Document 2 (Japanese Patent Laying-Open No. 2005-291200) discloses a structure in which timing of opening/closing an intake valve or an exhaust valve at the start of an engine is set to a start timing of an advanced angle side rather than the timing corresponding to the most retarded angle, and the variable valve timing is controlled such that the opening/closing timing when the engine is stopped is set to correspond to the start timing.

Further, Patent Documents 3 and 4 (Japanese Patent Laying-Open Nos. 2005-264864 and 2000-080939) disclose controllers that ensure good starting characteristic even when the actual valve timing is off from an appropriate start timing, by correcting an amount of fuel injection (supply amount) at the start of the engine in accordance with the actual valve timing.

In the valve timing controller disclosed in Patent Document 1, however, the valve timing is controlled such that, in response to turning-off of the ignition key, a process of stopping the engine is executed immediately, and by applying power to the hysteresis brake for a prescribed time period starting from the time of turning-off, the valve timing comes to be the start timing. Therefore, in a variable valve timing apparatus in which it is difficult to change the valve timing after the engine is stopped, the amount of possible change of the valve timing in the engine stop operation is limited.

Similarly, in the valve timing controller disclosed in Patent Document 2, a control structure is disclosed in which the valve timing is controlled with the start timing used as a target value when the engine stop operation is done. This reference, however, is silent about any structure to ensure sufficient amount of change in the valve timing. The same applies to Patent Documents 3 and 4.

DISCLOSURE OF THE INVENTION

An object of the present invention is, in a variable valve timing apparatus in which it is difficult to change the valve timing after the engine stops, to increase the amount of possible change in valve timing through valve timing control in the engine stop operation, without causing any uncomfortable feeling of the driver.

According to an aspect, the present invention provides a variable valve timing apparatus for changing a timing of opening/closing at least one of an intake valve and an exhaust valve provided in an engine, including an actuator, a changing mechanism, a target value setting portion, a determining portion, a stop permitting portion, a stop process delaying portion, and a termination forcing portion. The changing mechanism is configured to change the opening/closing timing, by changing difference in rotation phase of a camshaft driving the valve, of which opening/closing timing is to be changed, from rotation phase of a crankshaft by an amount of change in accordance with an operation amount of the actuator, while the engine is in operation. The target value setting portion sets, after issuance of an engine stop instruction, a target value of the opening/closing timing by the changing mechanism to a prescribed value. The determining portion determines, after issuance of the engine stop instruction, whether current opening/closing timing of the valve has reached the prescribed value or not. The stop permitting portion permits, when it is determined by the determining portion that the current opening/closing timing has reached the prescribed value, a process of stopping the engine. The stop process delaying portion delays, when it is not determined by the determining portion that the current opening/closing timing has reached the prescribed value within a prescribed time period from issuance of the engine stop instruction, permission of the engine stop process. The termination forcing portion forces, after the lapse of the prescribed time period from issuance of the engine stop instruction, permission of the engine stop process by the stop permitting portion, regardless of the current opening/closing timing.

Alternatively, the present invention provides a variable valve timing apparatus for changing a timing of opening/closing at least one of an intake valve and an exhaust valve provided in an engine, including an actuator, a changing mechanism, and a controller. The changing mechanism is configured to change the opening/closing timing, by changing difference in rotation phase of a camshaft driving the valve, of which opening/closing timing is to be changed, from rotation phase of a crankshaft by an amount of change in accordance with an operation amount of the actuator, while the engine is in operation. The controller sets, after issuance of an engine stop instruction, a target value of the opening/closing timing by the changing mechanism to a prescribed value, and determines, after issuance of the engine stop instruction, whether current opening/closing timing of the valve has reached the prescribed value or not. Further, the controller permits, when it is determined that the current opening/closing timing has reached the prescribed value, a process of stopping the engine, and delays, when it is determined that the current opening/closing timing has not yet reached the prescribed value and it is within a prescribed time period from issuance of the engine stop instruction, permission of the engine stop process. Further, the controller forces, after the lapse of the prescribed time period from issuance of the engine stop instruction, permission of the engine stop process by the stop permitting portion, regardless of the current opening/closing timing.

Alternatively, the present invention provides a method of controlling a variable valve timing apparatus for changing a timing of opening/closing at least one of an intake valve and an exhaust valve provided in an engine, wherein the variable valve timing apparatus includes an actuator and a changing mechanism. The changing mechanism is configured to change the opening/closing timing, by changing difference in rotation phase of a camshaft driving the valve, of which opening/closing timing is to be changed, from rotation phase of a crankshaft by an amount of change in accordance with an operation amount of the actuator, while the engine is in operation. The control method includes the steps of: setting, after issuance of the engine stop instruction, a target value of the opening/closing timing by the changing mechanism to a prescribed value; determining, after issuance of the engine stop instruction, whether current opening/closing timing of the valve has reached the prescribed value or not; permitting, when it is determined at the step of determining that the current opening/closing timing has reached the prescribed value, a process of stopping the engine; delaying, when it is not determined at the step of determining that the current opening/closing timing has reached the prescribed value, within a prescribed time period from issuance of the engine stop instruction, permission of the engine stop process; and forcibly permitting, after the lapse of the prescribed time period from issuance of the engine stop instruction, the engine stop process, regardless of the current opening/closing timing.

By the arrangement described above, in a variable valve timing apparatus in which it is difficult to change the valve timing (opening/closing timing) after the engine stops, when an engine stop instruction is issued, the engine stop process may be delayed, the valve timing is controlled with a prescribed value (such as a start timing suitable for the next engine start) used as a target value, and the engine stop process is reliably executed after the lapse of the prescribed time period from the issuance of the stop instruction. Therefore, it is possible to delay the engine stop process within a range that does not cause much uncomfortable feeling of the driver and to increase the changeable amount of valve timing when the engine is stopped (i.e. in the engine stop operation).

Preferably, the variable valve timing apparatus further includes a storage portion and a portion for setting fuel injection amount at a start of operation. The storage portion stores, at least when the engine stop process is permitted by the termination forcing portion, the opening/closing timing at the time point of engine stop. The portion for setting fuel injection amount at a start of operation variably sets, when the engine is started next time, an amount of fuel injection of the engine based on contents stored in the storage portion. Alternatively, the controller further stores, at least when permission of the engine stop process is forced, the opening/closing timing at the time point of engine stop, and variably sets, when the engine is started next time, an amount of fuel injection of the engine based on the stored opening/closing timing at the time when the engine was stopped.

Preferably, the method of controlling a variable valve timing apparatus further includes the steps of: storing, at least when the engine stop process is permitted at the step of permitting, the opening/closing timing at the time point of engine stop; and variably setting, when the engine is started next time, an amount of fuel injection of the engine based on contents stored at the step of storing.

Because of such an arrangement, even if the valve timing has not yet reached a target value at the time point of engine stop, the amount of fuel injection at the start of operation can be set appropriately, reflecting the deviation of valve timing, at the start of next engine operation. Thus, good starting characteristic of the engine is ensured.

Preferably, the changing mechanism is configured to change the opening/closing timing by a first amount of change with respect to the operation amount of the actuator when the opening/closing timing is in a first region, and to change the opening/closing timing by a second amount of change larger than the first amount of change with respect to the operation amount of the actuator when the opening/closing timing is in a second region different from the first region. The first phase region is provided to include the prescribed value (the prescribed value being the target value of opening/closing timing after issuance of the engine stop instruction).

Because of this arrangement, it becomes possible to set the target value of valve timing at the time point of engine stop to a region (first region) where the amount of change in valve timing is small relative to the amount of actuator operation. Therefore, the valve timing at the time point of engine stop can be maintained without the necessity of accurately controlling the operation of the actuator when the engine stops.

Alternatively, the variable valve timing apparatus further includes first and second convergence determining portions and an operation amount setting portion. The first convergence determining portion sets, when deviation between the current opening/closing timing and the target value is not larger than a first determination value before issuance of the engine stop instruction, the amount of operation of the actuator to approximately zero. The second convergence determining portion sets, when deviation between the current opening/closing timing and the target value is not larger than a second determination value larger than the first determination value, after issuance of the engine stop instruction, the amount of operation of the actuator to approximately zero. The operation amount setting portion sets, when the amount of operation of the actuator is not set to approximately zero by the first or second convergence determining portion, the amount of operation of the actuator in accordance with the deviation between the current opening/closing timing and the target value. Alternatively, the controller sets, when deviation between the current opening/closing timing and the target value is not larger than a first determination value before issuance of the engine stop instruction, the amount of operation of the actuator to approximately zero, and sets, when deviation between the current opening/closing timing and the target value is not larger than a second determination value larger than the first determination value, after issuance of the engine stop instruction, the amount of operation of the actuator to approximately zero. Further, the controller sets, when the amount of operation of the actuator is not set to approximately zero, the amount of operation of the actuator in accordance with the deviation between the current opening/closing timing and the target value.

Preferably, the method of controlling a variable valve timing apparatus further includes the steps of: setting, when deviation between the current opening/closing timing and the target value is not larger than a first determination value before issuance of the engine stop instruction, the amount of operation of the actuator to approximately zero; setting, when deviation between the current opening/closing timing and the target value is not larger than a second determination value larger than the first determination value, after issuance of the engine stop instruction, the amount of operation of the actuator to approximately zero; and setting, when the amount of operation of the actuator is not set to approximately zero, the amount of operation of the actuator in accordance with the deviation between the current opening/closing timing and the target value.

By such an arrangement, it becomes possible to terminate valve timing control quickly when the engine is stopped and to reduce power consumption, without requiring excessive accuracy of valve timing control when the engine is stopped.

Preferably, in the variable valve timing apparatus, the changing mechanism is configured to change the opening/closing timing by a first amount of change with respect to the operation amount of the actuator when the opening/closing timing is in a first region, and to change the opening/closing timing by a second amount of change larger than the first amount of change with respect to the operation amount of the actuator when the opening/closing timing is in a second region different from the first region. The prescribed value is set in the first phase region (the prescribed value being the target value of opening/closing timing after issuance of the engine stop instruction).

Alternatively, the controller sets the prescribed value in the first phase region, determines whether the current opening/closing timing of the valve is within the first region or not after issuance of the engine stop instruction, and determines that the current opening/closing timing has reached the prescribed value also when it is determined that the current opening/closing timing is in the first region.

Preferably, in the method of controlling a variable valve timing apparatus, the changing mechanism is configured to change the opening/closing timing by a first amount of change with respect to the operation amount of the actuator when the opening/closing timing is in a first region, and to change the opening/closing timing by a second amount of change larger than the first amount of change with respect to the operation amount of the actuator when the opening/closing timing is in a second region different from the first region. The prescribed value is set in the first phase region (the prescribed value being the target value of opening/closing timing after issuance of the engine stop instruction). At the step of determining of the control method, whether the current opening/closing timing of the valve is within the first region or not after issuance of the engine stop instruction is further determined, and it is determined that the current opening/closing timing has reached the prescribed value also when it is determined that the current opening/closing timing is in the first region.

According to the variable valve timing apparatus described above, in a variable valve timing apparatus in which it is difficult to change valve timing after the engine stops, when the engine stop instruction is issued, the valve timing is controlled such that the valve timing attains to a region (first region) where the valve timing can be maintained without accurately controlling the actuator operation while the engine is stopped, and the engine stop process may be delayed, so that the amount of changeable valve timing at this time is increased. Further, the engine stop process can reliably be executed after the lapse of a prescribed time period from the issuance of the stopping instruction, and hence, the driver does not much feel discomfort.

More preferably, the variable valve timing apparatus further includes a storage portion and a portion for setting fuel injection amount at a start of operation. The storage portion stores the opening/closing timing at the time point of engine stop. The portion for setting fuel injection amount at a start of operation variably sets an amount of fuel injection of the engine based on contents stored in the storage portion, when the engine is started next time. Alternatively, the controller further stores the opening/closing timing at the time point of engine stop, and variably sets an amount of fuel injection of the engine based on the stored contents, when the engine is started next time.

More preferably, the method of controlling a variable valve timing apparatus further includes the steps of storing the opening/closing timing at the time point of engine stop; and variably setting an amount of fuel injection of the engine based on contents stored at the step of storing, when the engine is started next time.

Because of such an arrangement, even if the valve timing has not yet reached a target value (for example, a start timing suitable for the start of operation of the engine next time) when the engine stops, the amount of fuel injection at the start of operation can be set appropriately, reflecting the deviation of valve timing, at the start of next engine operation. Thus, good starting characteristic of the engine is ensured.

Preferably, the actuator is implemented by an electric motor, and operation amount of the actuator is difference in rotation speed of the electric motor relative to the rotation speed of the camshaft.

By such an arrangement, in a structure in which the electric motor is an actuator, and the amount of operation of the actuator is difference in speed of rotation of the electric motor relative to a camshaft of which rotation is stopped as the engine is stopped, the engine stop process may be delayed to a limited extent not to cause any uncomfortable feeling of the driver, and the amount of changeable valve timing can be ensured in the engine stop operation.

BEST MODES FOR CARRYING OUT THE INVENTION

Figure 1:
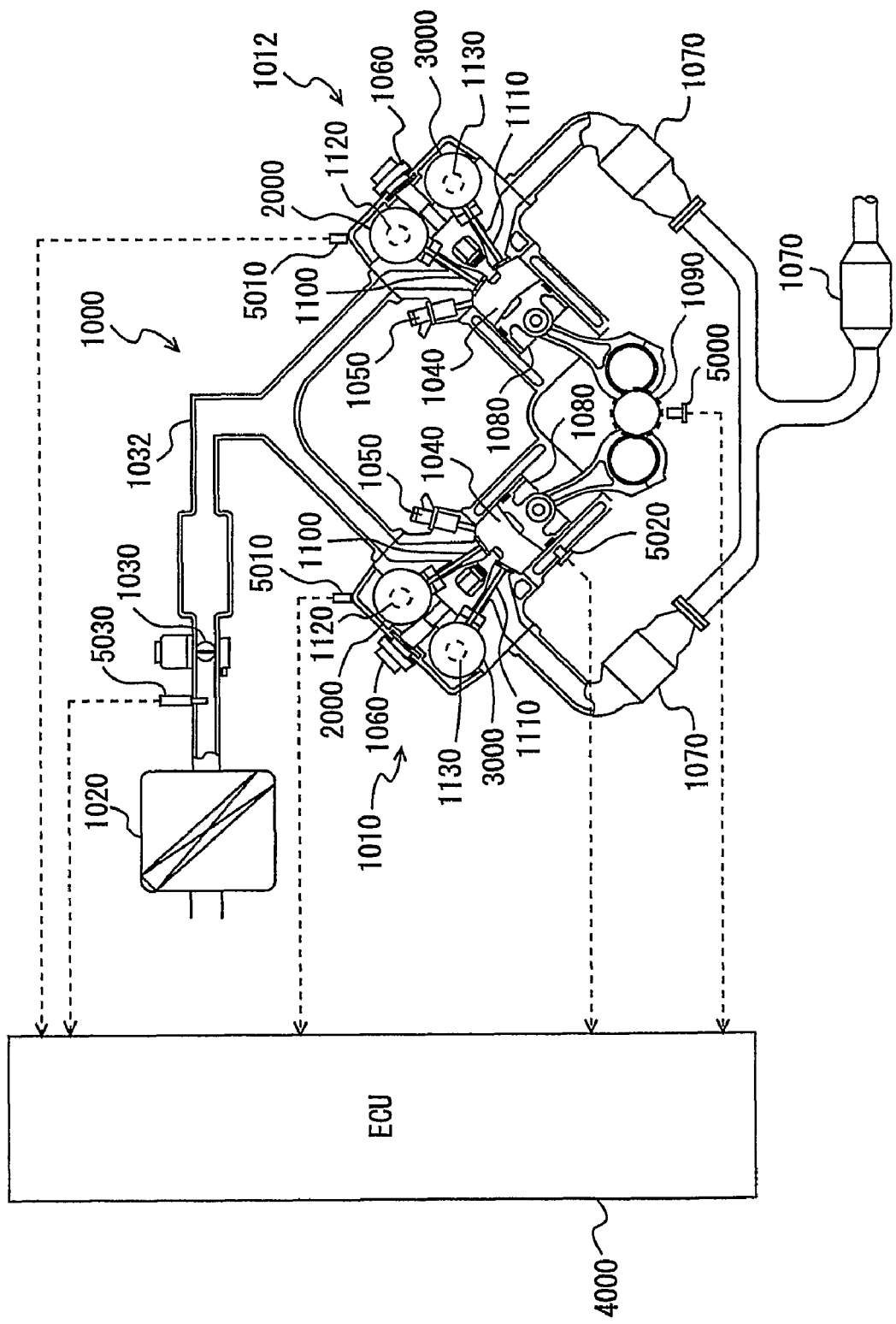
FIG. 1 is a schematic diagram showing a configuration of an engine of a vehicle on which a variable valve timing apparatus is mounted according to an embodiment of the present invention.

With reference to the drawings, embodiments of the present invention will be hereinafter described. In the following description, like components are denoted by like reference characters. Their names and functions are also the same. Therefore, detailed description thereof will not be repeated.

Referring to FIG. 1, a description is given of an engine of a vehicle on which a variable valve timing apparatus is mounted, according to an embodiment of the present invention.

An engine 1000 is a V-type 8-cylinder engine having a first bank 1010 and a second bank 1012 each including a group of four cylinders. Here, application of the present invention is not limited to any engine type, and the variable valve timing apparatus that will be described in the following is applicable to an engine of the type different from the V-type 8 cylinder engine.

Into engine 1000, air is sucked from an air cleaner 1020. The quantity of sucked air is adjusted by a throttle valve 1030. Throttle valve 1030 is an electronic throttle valve driven by a motor.

The air is supplied through an intake manifold 1032 into a cylinder 1040. The air is mixed with fuel in cylinder 1040 (combustion chamber). Into cylinder 1040, the fuel is directly injected from an injector 1050. In other words, injection holes of injector 1050 are provided within cylinder 1040.

The fuel is injected in the intake stroke. The fuel injection timing is not limited to the intake stroke. Further, in the present embodiment, engine 1000 is described as a direct-injection engine having injection holes of injector 1050 that are disposed within cylinder 1040. However, in addition to direct-injection (in-cylinder) injector 1050, a port injector may be provided. Moreover, only the port injector may be provided.

The air-fuel mixture in cylinder 1040 is ignited by a spark plug 1060 and accordingly burned. The air-fuel mixture after burned, namely exhaust gas, is cleaned by a three-way catalyst 1070 and thereafter discharged to the outside of the vehicle. The air-fuel mixture is burned to press down a piston 1080 and thereby to rotate a crankshaft 1090.

At the top of cylinder 1040, an intake valve 1100 and an exhaust valve 1110 are provided. Intake valve 1100 is driven by an intake camshaft 1120. Exhaust valve 1110 is driven by an exhaust camshaft 1130. Intake camshaft 1120 and exhaust camshaft 1130 are coupled by such parts as a chain and gears to be rotated at the same rotation speed (one-half the rotation speed of crankshaft 1090). The rotation speed of a rotating body such as a shaft is generally represented by the number of rotation per unit time (typically, number of rotation per minute: rpm).

Intake valve 1100 has its phase (opening/closing timing) controlled by an intake VVT mechanism 2000 provided to intake camshaft 1120. Exhaust valve 1110 has its phase (opening/closing timing) controlled by an exhaust VVT mechanism 3000 provided to exhaust camshaft 1130.

In the present embodiment, intake camshaft 1120 and exhaust camshaft 1130 are rotated by the VVT mechanisms to control respective phases of intake valve 1100 and exhaust valve 1110. Here, the phase control method is not limited to the one described above.

Figure 3:
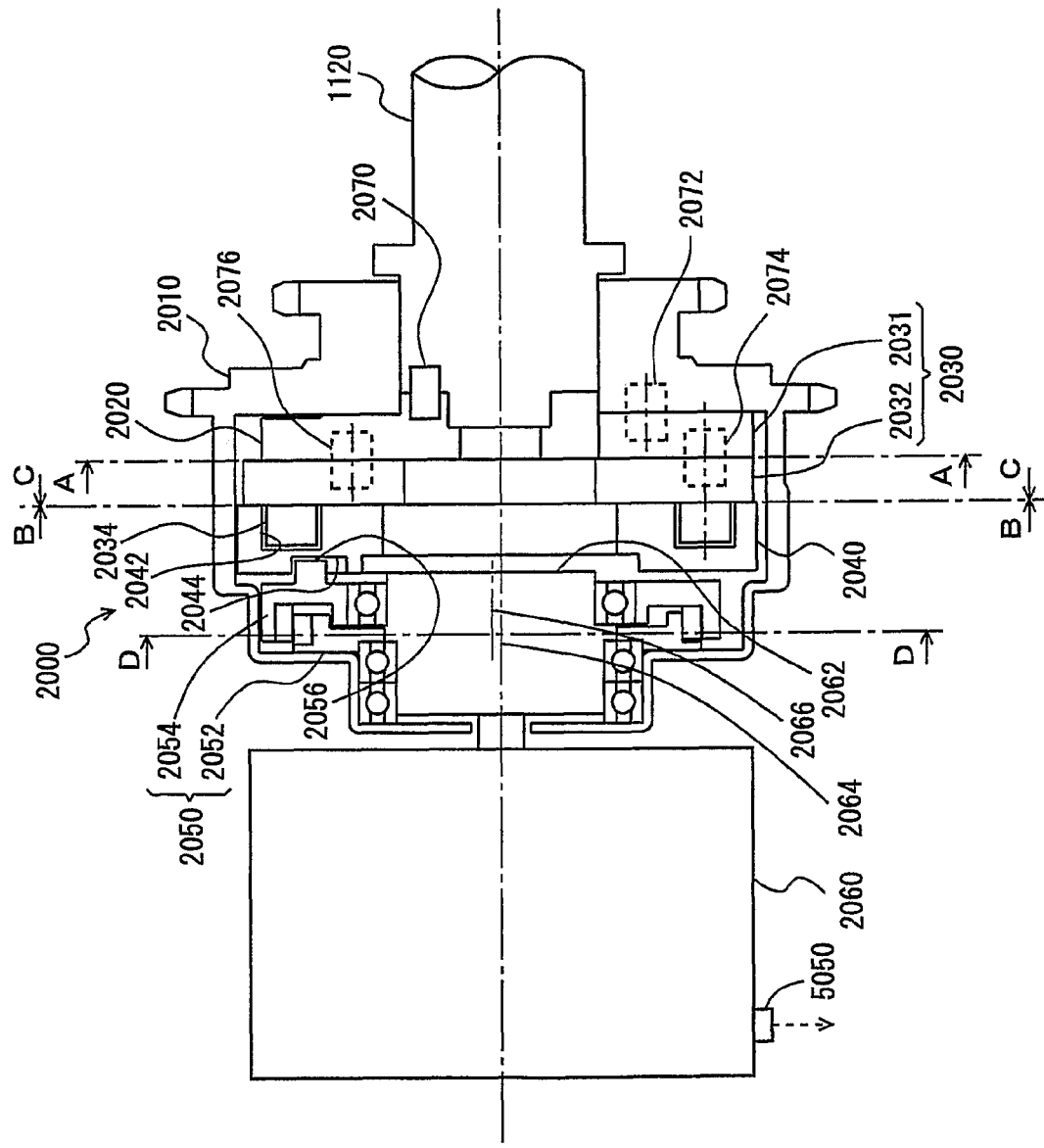
FIG. 3 is a cross section showing an intake VVT mechanism.

Intake VVT mechanism 2000 is operated by an electric motor 2060 (shown in FIG. 3). Electric motor 2060 is controlled by an Electronic Control Unit (ECU) 4000. The current and voltage of electric motor 2060 are detected by an ammeter (not shown) and a voltmeter (not shown) and the measurements are input to ECU 4000.

Exhaust VVT mechanism 3000 is hydraulically operated. Here, intake VVT mechanism 2000 may be hydraulically operated while exhaust VVT mechanism 3000 may be operated by an electric motor.

To ECU 4000, signals indicating the rotation speed and the crank angle of crankshaft 1090 are input from a crank angle sensor 5000. Further, to ECU 4000, signals indicating respective phases of intake camshaft 1120 and exhaust camshaft 1130 (phase: the camshaft position in the rotational direction) are input from a cam position sensor 5010.

Furthermore, to ECU 4000, a signal indicating the water temperature (coolant temperature) of engine 1000 from a coolant temperature sensor 5020 as well as a signal indicating the quantity of intake air (quantity of air taken or sucked into engine 1000) of engine 1000 from an airflow meter 5030 are input.

Based on these signals input from the sensors as well as a map and a program stored in a memory (not shown), ECU 4000 controls the throttle opening position, the ignition timing, the fuel injection timing, the quantity of injected fuel, the phase of intake valve 1100 and the phase of exhaust valve 1110 for example, so that engine 1000 is operated in a desired operating state.

Figure 2:
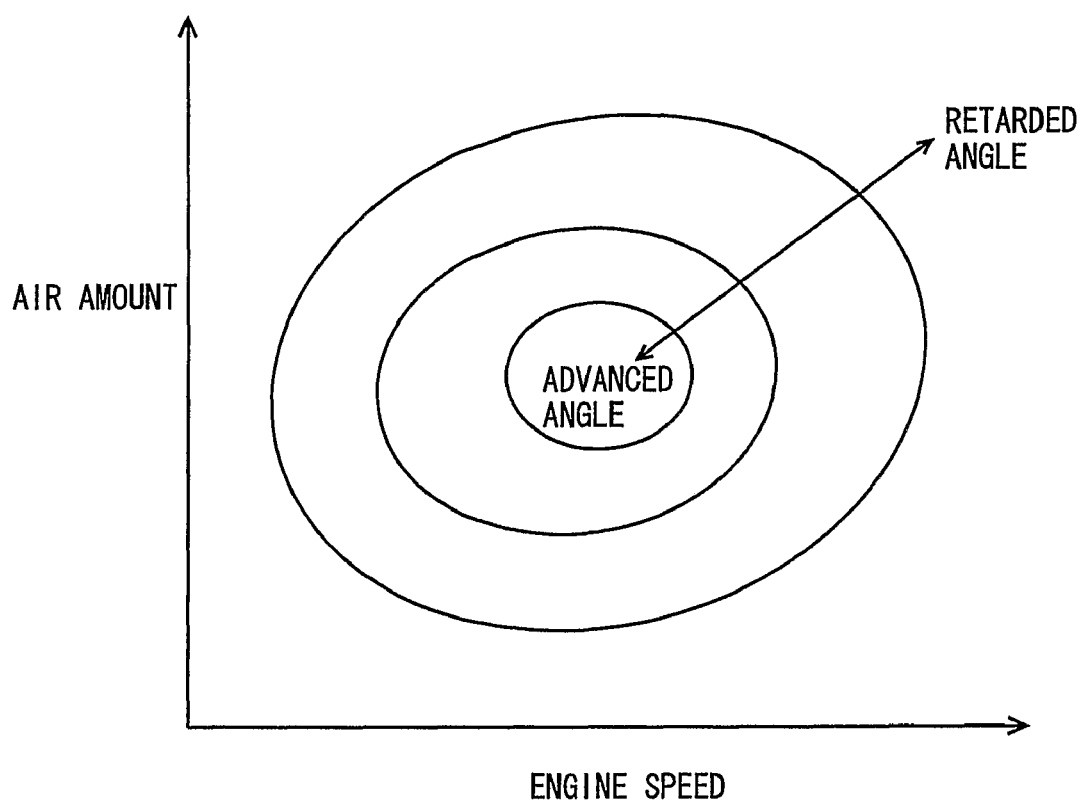
FIG. 2 shows a map defining the phase of an intake camshaft.

In the present embodiment, ECU 4000 determines the phase of intake valve 1100 based on the map as shown in FIG. 2 that uses the engine speed NE and the intake air quantity KL as parameters. A plurality of maps for respective coolant temperatures are stored for determining the phase of intake valve 1100.

In the following, a further description is given of intake VVT mechanism 2000. Here, exhaust VVT mechanism 3000 may have the same configuration as that of intake VVT mechanism 2000 as described below, or each of intake VVT mechanism 2000 and exhaust VVT mechanism 3000 may have the same configuration as that of intake VVT mechanism 2000 as described below.

As shown in FIG. 3, intake VVT mechanism 2000 includes a sprocket 2010, a cam plate 2020, a link mechanism 2030, a guide plate 2040, reduction gears 2050, and electric motor 2060.

Sprocket 2010 is coupled via a chain or the like to crankshaft 1090. The rotation speed of sprocket 2010 is half the rotation speed of crankshaft 1090, as in the case of intake camshaft 1120 and exhaust camshaft 1130. Intake camshaft 1120 is provided concentrically with the rotational axis of sprocket 2010 and rotatable relative to sprocket 2010.

Cam plate 2020 is coupled to intake camshaft 1120 with a pin (1) 2070. Cam plate 2020 rotates, in sprocket 2010, together with intake camshaft 1120. Here, cam plate 2020 and intake camshaft 1120 may be integrated into one unit.

Figure 4:
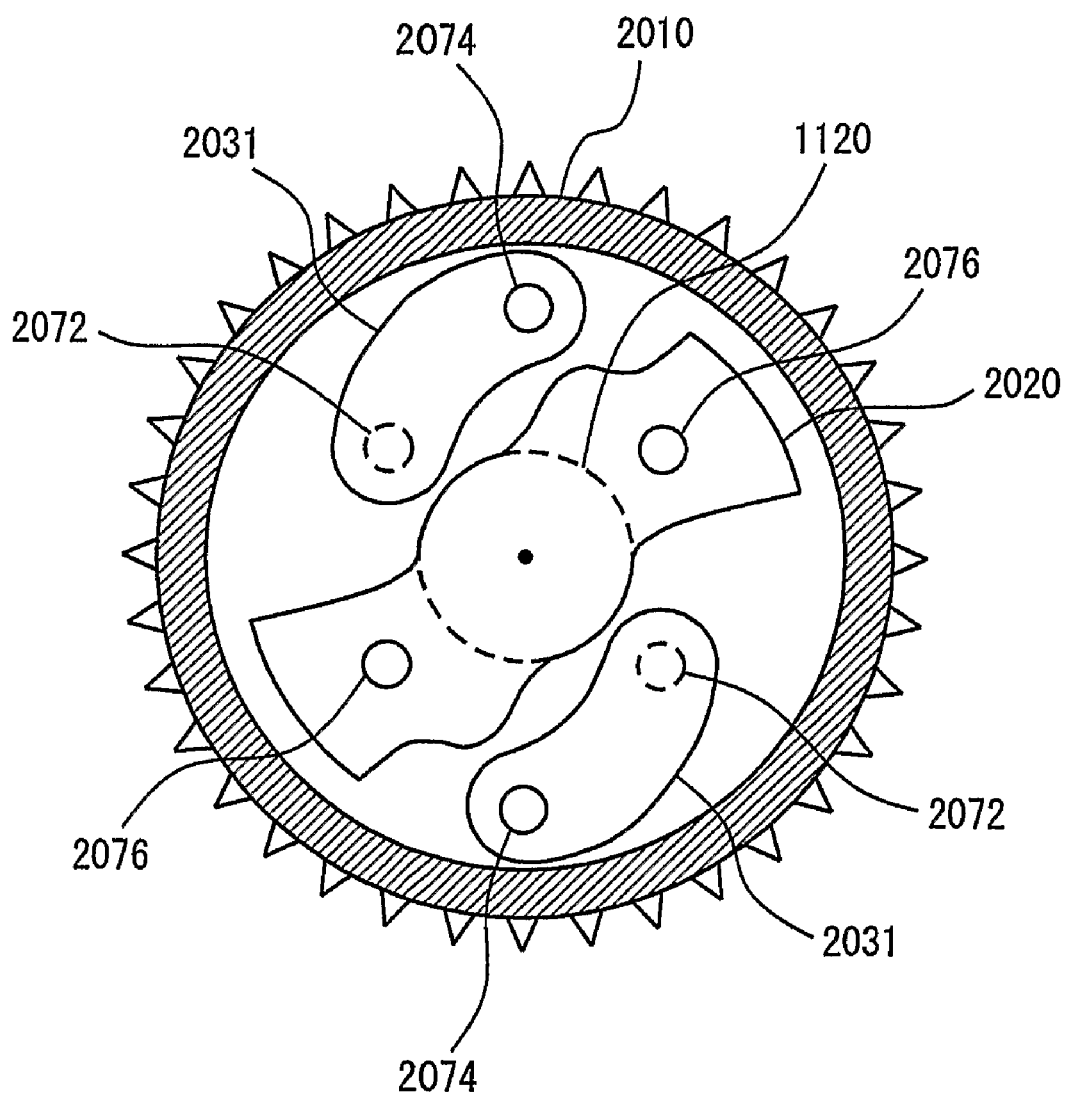
FIG. 4 is a cross section along A-A in FIG. 3.

Link mechanism 2030 is comprised of an arm (1) 2031 and an arm (2) 2032. As shown in FIG. 4, which is a cross section along A-A in FIG. 3, a pair of arms (1) 2031 is provided within sprocket 2010 so that the arms are point symmetric to each other with respect to the rotational axis of intake camshaft 1120. Each arm (1) 2031 is coupled to sprocket 2010 so that the arm can swing about a pin (2) 2072.

Figure 5:
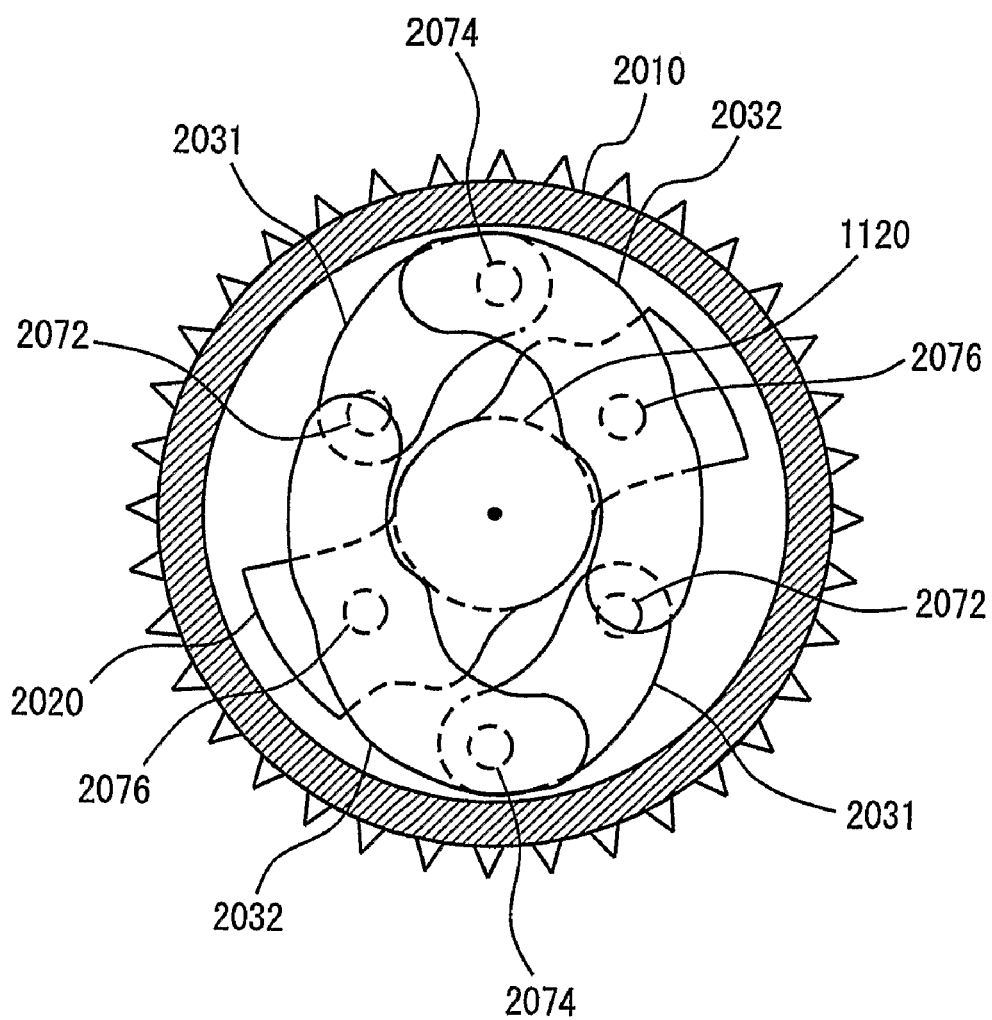
FIG. 5 is a (first) cross section along B-B in FIG. 3.
Figure 6:
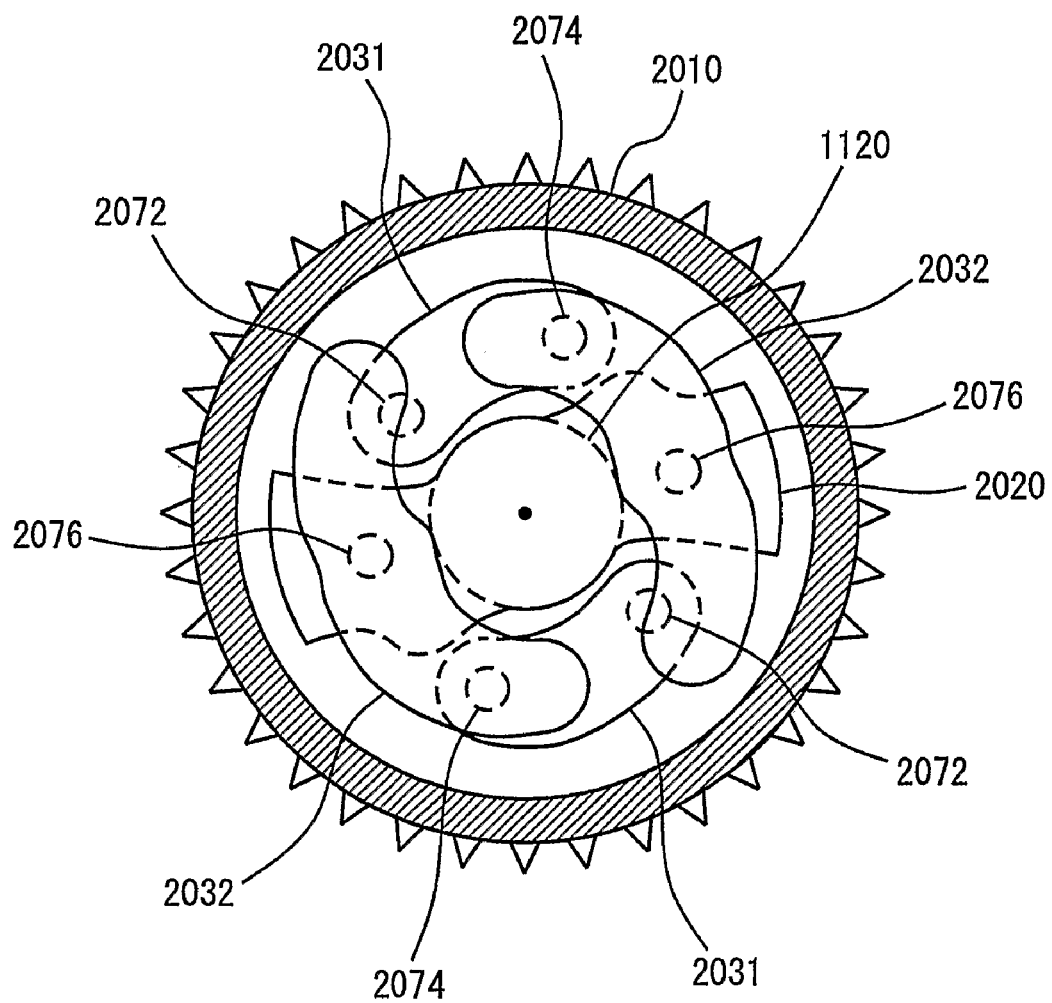
FIG. 6 is a (second) cross section along B-B in FIG. 3.

As shown in FIG. 5, which is a cross section along B-B in FIG. 3, and as shown in FIG. 6 showing the state where the phase of intake valve 1100 is advanced with respect to the state in FIG. 5, arms (1) 2031 and cam plate 2020 are coupled by arms (2) 2032.

Arm (2) 2032 is supported such that the arm can swing about a pin (3) 2074 and with respect to arm (1) 2031. Further, arm (2) 2032 is supported such that the arm can swing about a pin (4) 2076 and with respect to cam plate 2020.

A pair of link mechanisms 2030 causes intake camshaft 1120 to rotate relative to sprocket 2010 and thereby changes the phase of intake valve 1100. Thus, even if one of the paired link mechanisms 2030 should be damaged or broken, the other link mechanism can be used to change the phase of intake valve 1100.

Referring back to FIG. 3, at a surface of each link mechanism 2030 (arm (2) 2032) that is a surface facing guide plate 2040, a control pin 2034 is provided. Control pin 2034 is provided concentrically with pin (3) 2074. Each control pin 2034 slides in a guide groove 2042 provided in guide plate 2040.

Each control pin 2034 slides in guide groove 2042 of guide plate 2040, to be shifted in the radial direction. The radial shift of each control pin 2034 causes intake camshaft 1120 to rotate relative to sprocket 2010.

Figure 7:
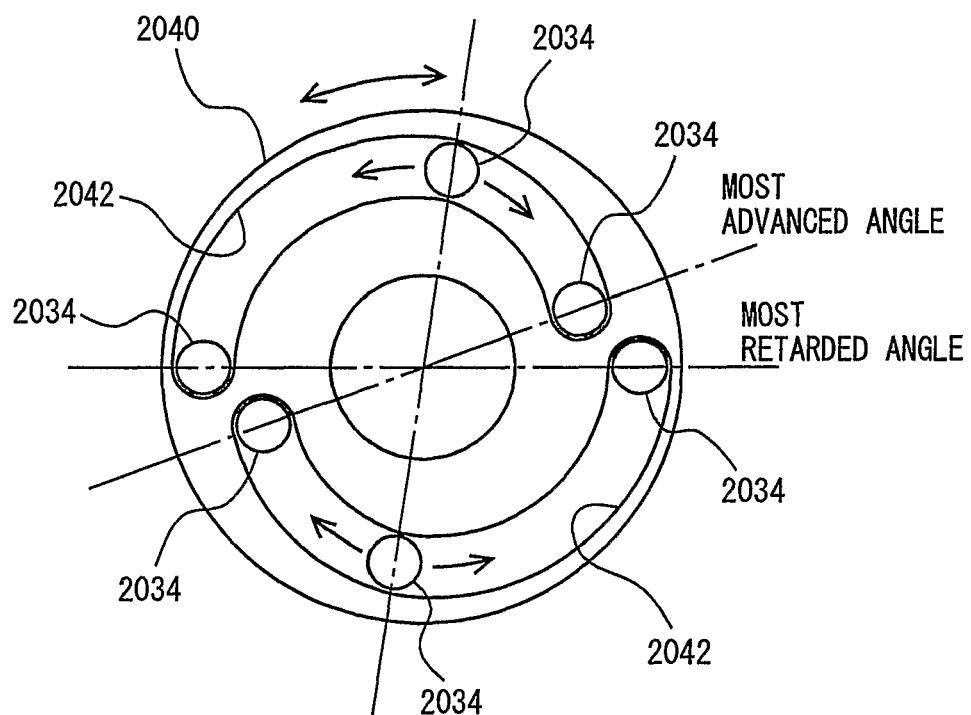
FIG. 7 is a cross section along C-C in FIG. 3.

As shown in FIG. 7, which is a cross section along C-C in FIG. 3, guide groove 2042 is formed in the spiral shape so that rotation of guide plate 2040 causes each control pin 2034 to shift in the radial direction. Here, the shape of guide groove 2042 is not limited to this.

As control pin 2034 is shifted further in the radial direction from the axial center of guide plate 2040, the phase of intake valve 1100 is retarded to a greater extent. In other words, the amount of change of the phase has a value corresponding to the operation amount of link mechanism 2030 generated by the radial shift of control pin 2034. Alternatively, the phase of intake valve 1100 may be advanced to a greater extent as control pin 2034 is shifted further in the radial direction from the axial center of guide plate 2040.

As shown in FIG. 7, when control pin 2034 abuts on an end of guide groove 2042, the operation of link mechanism 2030 is restrained. Therefore, the phase in which control pin 2034 abuts on an end of guide groove 2042 is the phase of the most retarded angle or the most advanced angle.

Referring back to FIG. 3, in guide plate 2040, a plurality of depressed portions 2044 are provided in its surface facing reduction gears 2050, for coupling guide plate 2040 and reduction gears 2050 to each other.

Reduction gears 2050 are comprised of an outer teeth gear 2052 and an inner teeth gear 2054. Outer teeth gear 2052 is fixed with respect to sprocket 2010 so that the gear rotates together with sprocket 2010.

Inner teeth gear 2054 has a plurality of protruded portions 2056 thereon that are received in depressed portions 2044 of guide plate 2040. Inner teeth gear 2054 is supported rotatably about an eccentric axis 2066 of a coupling 2062 formed eccentrically with respect to an axial center 2064 of an output shaft of electric motor 2060.

Figure 8:
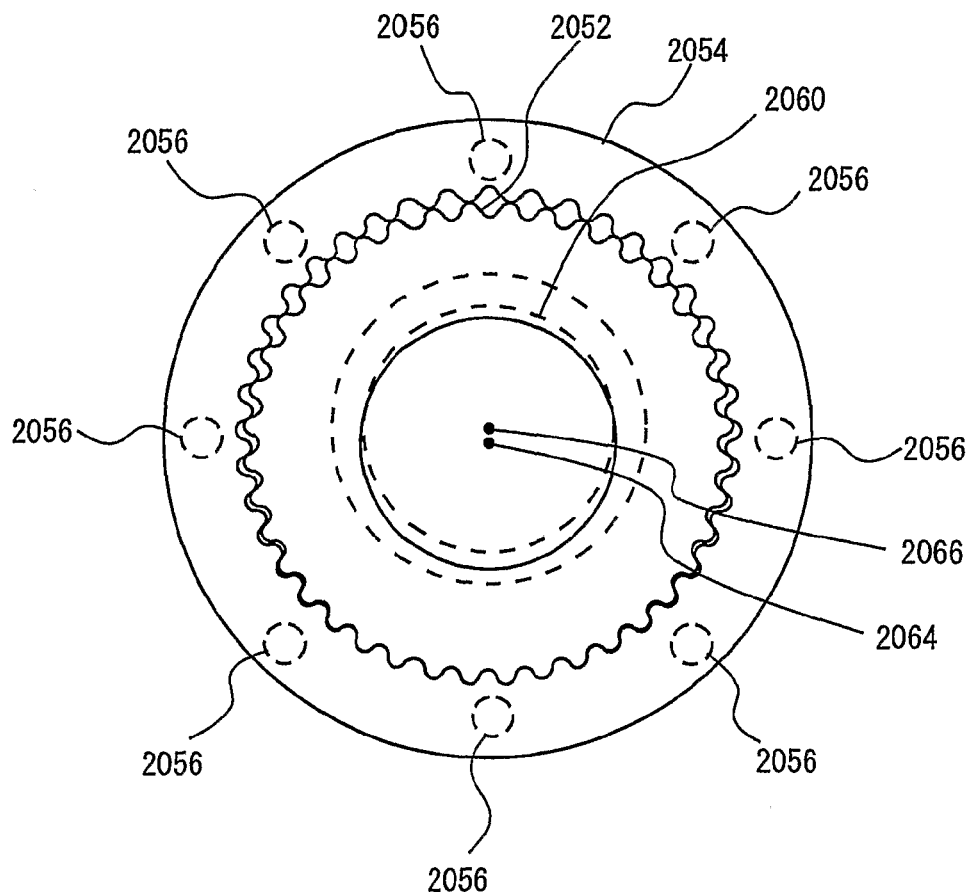
FIG. 8 is a cross section along D-D in FIG. 3.

FIG. 8 shows a cross section along D-D in FIG. 3. Inner teeth gear 2054 is provided such that a part of the teeth thereof meshes with outer teeth gear 2052. When the rotation speed of the output shaft of electric motor 2060 is identical to the rotation speed of sprocket 2010, coupling 2062 and inner teeth gear 2054 rotate at the same rotation speed as that of outer teeth gear 2052 (sprocket 2010). In this case, guide plate 2040 rotates at the same rotation speed as that of sprocket 2010 and accordingly the phase of intake valve 1100 is maintained.

When electric motor 2060 causes coupling 2062 to rotate about axial center 2064 and relative to outer teeth gear 2052, inner teeth gear 2054 as a whole accordingly revolves about axial center 2064 while inner teeth gear 2054 rotates about eccentric axis 2066. The rotational motion of inner teeth gear 2054 causes guide plate 2040 to rotate relative to sprocket 2010 and thus the phase of intake valve 1100 is changed.

As can be understood from the structure described above, once the engine is stopped, that is, when the rotation of sprocket 2010 is stopped, it is difficult to change the phase of intake valve 1010 by rotating inner teeth gear 2054 only by electric motor 2060. For confirmation, it is described here that in intake VVT mechanism 200, it is difficult to change the valve timing after the engine is stopped.

The phase of intake valve 1100 is changed by reduction of the rotation speed of relative rotation between the output shaft of electric motor 2060 and sprocket 2010 (operation amount of electric motor 2060) by reduction gears 2050, guide plate 2040 and link mechanism 2030. Here, the rotation speed of relative rotation between the output shaft of electric motor 2060 and sprocket 2010 may be increased to change the phase of intake valve 1100. On the output shaft of electric motor 2060, a motor rotation angle sensor 5050 is provided, which outputs a signal indicating an angle of rotation (position of the output shaft in the rotating direction) of the output shaft. Motor rotation angle sensor 5050 is generally configured to generate a pulse signal every time the output shaft of electric motor rotates by a prescribed angle. Based on the output of motor rotation angle sensor 5050, the rotation speed of the output shaft of electric motor 2060 (hereinafter also simply referred to as rotation speed of electric motor 2060) can be detected.

Figure 9:
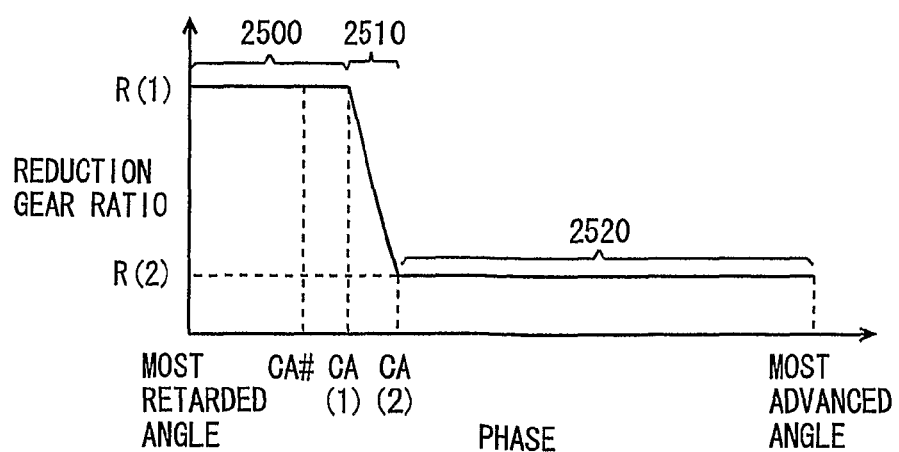
FIG. 9 shows the reduction gear ratio of the intake VVT mechanism as a whole.

As shown in FIG. 9, the reduction gear ratio $R(\theta)$ of intake VVT mechanism 2000 as a whole, that is, the ratio of rotation speed of relative rotation between the output shaft of electric motor 2060 and sprocket 2010 to the amount of phase-change, may have a value according to the phase of intake valve 1100. In the present embodiment, as the reduction gear ratio is higher, the amount of phase-change with respect to the rotation speed of relative rotation between the output shaft of electric motor 2060 and sprocket 2010 is smaller.

In the case where the phase of intake valve 1100 is in a phase region 2500 from the most retarded angle to CA (1), the reduction gear ratio of intake VVT mechanism 2000 as a whole is R(1). In the case where the phase of intake valve 1100 is in a phase region 2510 from CA (2) (CA (2) is advanced with respect to CA (1)) to the most advanced angle, the reduction gear ratio of intake VVT mechanism 2000 as a whole is R (2) (R (1)>R (2)).

In the case where the phase of intake valve 1100 is in a phase region 2520 from CA (1) to CA (2), the reduction gear ratio of intake VVT mechanism 2000 as a whole changes at a predetermined rate of change ((R (2)−R (1))/(CA (2)−CA (1)).

In the present embodiment, a region where the reduction gear ratio R(θ) is large (specifically, the first phase region 2500 on the retarded angle side than CA(1)) is provided to include the phase target CA# of intake valve 1100 when the engine is stopped. The target phase CA# represents the phase of intake valve 1100 suitable for the start of next engine operation, and under general conditions, it is substantially the same as the phase target of intake valve 1100 during an idle operation.

Based on the configuration as described above, intake VVT mechanism 2000 of the variable valve timing apparatus of the present embodiment functions as described below.

Figure 10:
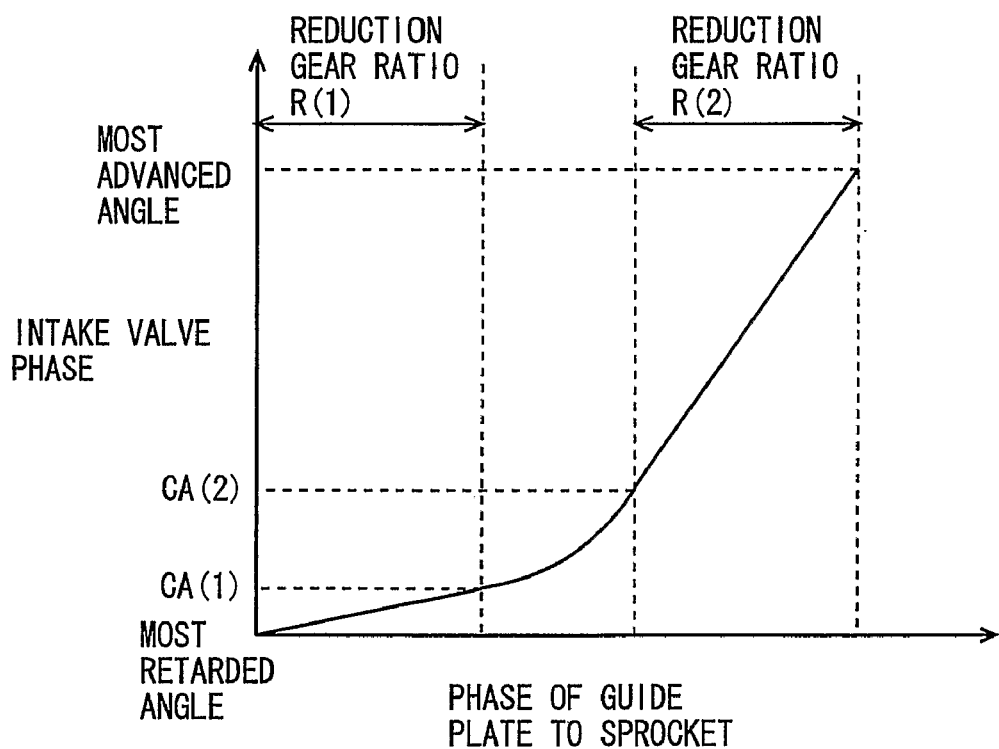
FIG. 10 shows a relation between the phase of a guide plate relative to a sprocket and the phase of an intake camshaft.

When the phase of intake valve 1100 (intake camshaft 1120) is to be advanced, electric motor 2060 is operated to rotate guide plate 2040 relative to sprocket 2010, thereby advancing the phase of intake valve 1100 as shown in FIG. 10.

When the phase of intake valve 1100 is in the first region between the most retarded angle and CA (1), the rotation speed of relative rotation between the output shaft of electric motor 2060 and sprocket 2010 is reduced at reduction gear ratio R (1) and the phase of intake valve 1100 is advanced.

In the case where the phase of intake valve 1100 is in the second region between CA (2) and the most advanced angle, the rotation speed of relative rotation between the output shaft of electric motor 2060 and sprocket 2010 is reduced at reduction gear ratio R (2) and the phase of intake valve 1100 is advanced.

When the phase of intake valve 1100 is to be retarded, the output shaft of electric motor 2060 is rotated relative to sprocket 2010 in the direction opposite to the direction when the phase thereof is to be advanced. As in the case of advancing the phase, when the phase is to be retarded and the phase of intake valve 1100 is in the first region between the most retarded angle and CA (1), the rotation speed of relative rotation between the output shaft of electric motor 2060 and sprocket 2010 is reduced at reduction gear ratio R (1) and the phase is retarded. Further, when the phase of intake valve 1100 is in the second region between CA (2) and the most advanced angle, the rotation speed of relative rotation between the output shaft of electric motor 2060 and sprocket 2010 is reduced at reduction gear ratio R (2) and the phase is retarded.

Accordingly, as long as the direction of the relative rotation between the output shaft of electric motor 2060 and sprocket 2010 is the same, the phase of intake valve 1100 can be advanced or retarded for both of the first region between the most retarded angle and CA (1) and the second region between CA (2) and the most advanced angle. Here, for the second region between CA (2) and the most advanced angle, the phase can be more advanced or more retarded. Thus, the phase can be changed over a wide range.

Further, since the reduction gear ratio is high for the first region between the most retarded angle and CA (1), a large torque is necessary, for rotating the output shaft of electric motor 2060 by a torque acting on intake camshaft 1120 as engine 1000 operates. Therefore, even if electric motor 2060 generates no torque as in the case where electric motor 2060 is stopped, rotation of the output shaft of electric motor 2060 caused by the torque acting on intake camshaft 1120 can be prevented. Therefore, a change of the actual phase from a phase determined under control can be restrained. Further, unintended change in phase can be prevented when power supply to electric motor 2060 as the actuator is stopped.

When the phase of intake valve 1100 is in the third region between CA (1) and CA (2), the rotation speed of relative rotation between the output shaft of electric motor 2060 and sprocket 2010 is reduced at a reduction gear ratio that changes at a predetermined rate of change, which may result in advance or retard in phase of intake valve 1100.

Accordingly, when the phase changes from the first region to the second region or from the second region to the first region, the amount of change of the phase with respect to the rotation speed of relative rotation between the output shaft of electric motor 2060 and sprocket 2010 can be increased or decreased gradually. In this way, a sudden stepwise change of the amount of change in phase can be restrained, to thereby restrain a sudden change in phase. Accordingly, phase controllability can be improved.

As discussed above, in the intake VVT mechanism for the variable valve timing apparatus in the present embodiment, when the phase of the intake valve is in the region from the most retarded angle to CA (1), reduction gear ratio of intake VVT mechanism 2000 as a whole is R (1). When the phase of the intake valve is in the region from CA (2) to the most advanced angle, the reduction gear ratio of intake VVT mechanism 2000 as a whole is R (2), which is lower than R (1). Thus, as long as the rotational direction of the output shaft of the electric motor is the same, the phase of the intake valve can be advanced or retarded for both of the regions, namely the first region between the most retarded angle and CA (1) and the second region between CA (2) and the most advanced angle. Here, for the second region between CA (2) and the most advanced angle, the phase can be advanced or retarded to a greater extent. Therefore, the phase can be changed over a wide range. Further, for the first region between the most retarded angle and CA (1), the reduction gear ratio is high and therefore, it is possible to prevent rotation of the output shaft of the electric motor by the torque acting on the intake camshaft as the engine is operated. Thus, a change of the actual phase from a phase determined under control can be restrained. Accordingly, the phase can be changed over a wide range and the phase can be controlled accurately.

Next, the structure for controlling the phase of intake valve 1100 (hereinafter also simply referred to as the intake valve phase) will be described in detail.

Figure 11:
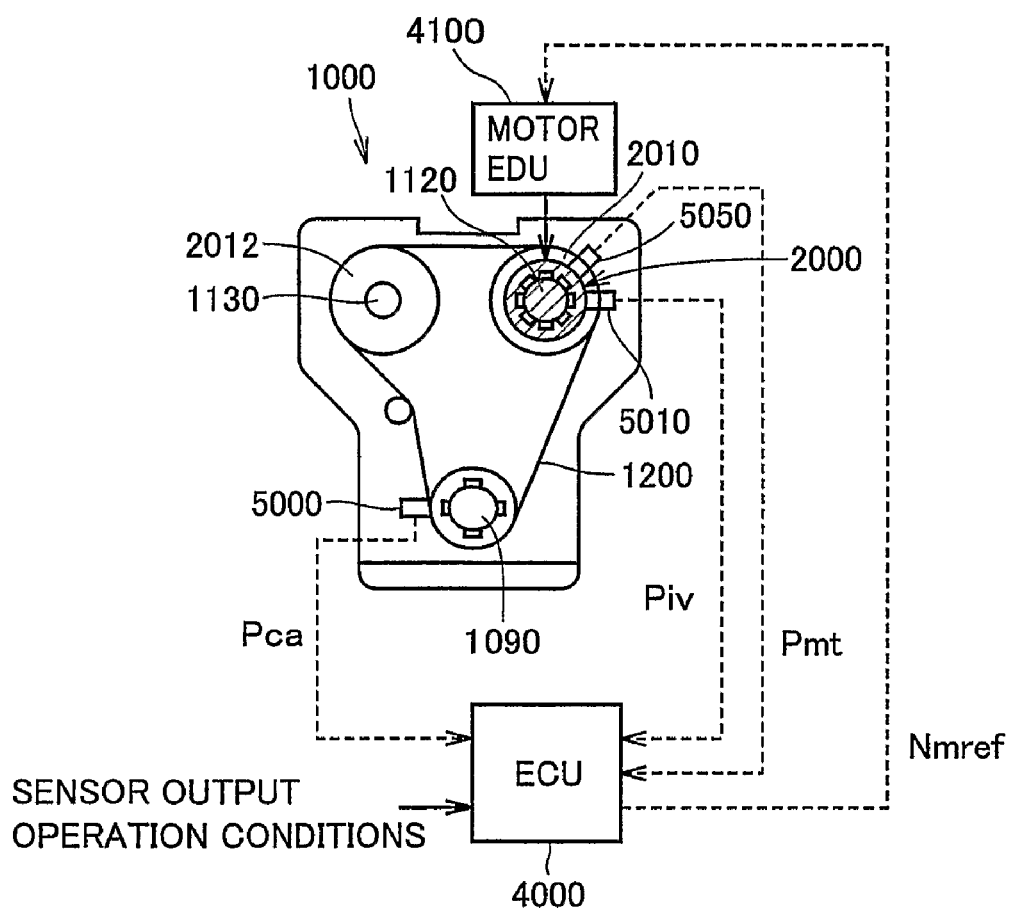
FIG. 11 is a schematic block diagram illustrating a control structure of intake valve phase by the variable valve timing apparatus in accordance with the present embodiment.

Referring to FIG. 11, as already described with reference to FIG. 1, engine 1000 is configured such that power from crankshaft 1090 is transmitted to intake camshaft 1120 and exhaust camshaft 1130 through sprockets 2010 and 2012, respectively, by means of a timing chain 1200 (or a timing belt). Further, on the outer circumferential side of intake camshaft 1120, a cam position sensor 5010 is attached, for outputting a cam angle signal Piv, at every prescribed cam angle. On the outer circumferential side of crankshaft 1090, a crank angle sensor 5000 is attached, for outputting a crank angle signal Pca, at every prescribed crank angle. Further, on a rotor (not shown) of electric motor 2060, a motor rotation angle sensor 5050 is attached, for outputting a motor rotation angle signal Pmt, at every prescribed rotation angle. The cam angle signal Piv, crank angle signal Pca and motor rotation angle signal Pmt are input to ECU 4000.

Further, based on the outputs of sensors detecting the state of engine 1000 and on operation conditions (pedal operation of the driver, current vehicle speed and the like), ECU 4000 controls the operation of engine 1000 so that required output of engine 1000 can be attained. As a part of engine control, ECU 4000 sets phase target values (target phases) of intake valve 1100 and exhaust valve 1110, based on the map shown in FIG. 2.

Further, ECU 4000 generates a rotation speed command value Nmref of electric motor 2060 as the actuator of intake VVT mechanism 2000 such that the phase of intake valve 1100 reaches the target phase. The rotation speed command Nmref is determined corresponding to the rotation speed of output shaft of electric motor 2060 relative to sprocket 2010 (intake camshaft 1120), as will be described later. The difference in rotation speed of electric motor 2060 relative to intake camshaft 1120 corresponds to the operation amount of actuator. Motor EDU (Electronic Drive Unit) 4100 controls the rotation speed of electric motor 2060, in accordance with the rotation speed command Nmref from ECU 4000.

When the engine is stopped (i.e. in the engine stop operation), specifically, when a command to stop engine 1000 is generated, the target value of valve phase (target phase) is set to a valve phase suitable for starting the engine operation, to be ready for the start of the next engine operation. Therefore, at the time point of engine stop, if the intake valve phase is different from the target phase suitable for the start of engine operation (not yet reached the target phase), it is necessary to change the intake valve phase (that is, the phase of intake camshaft 1120) by the variable valve timing apparatus, after the engine is stopped.

Figure 12:
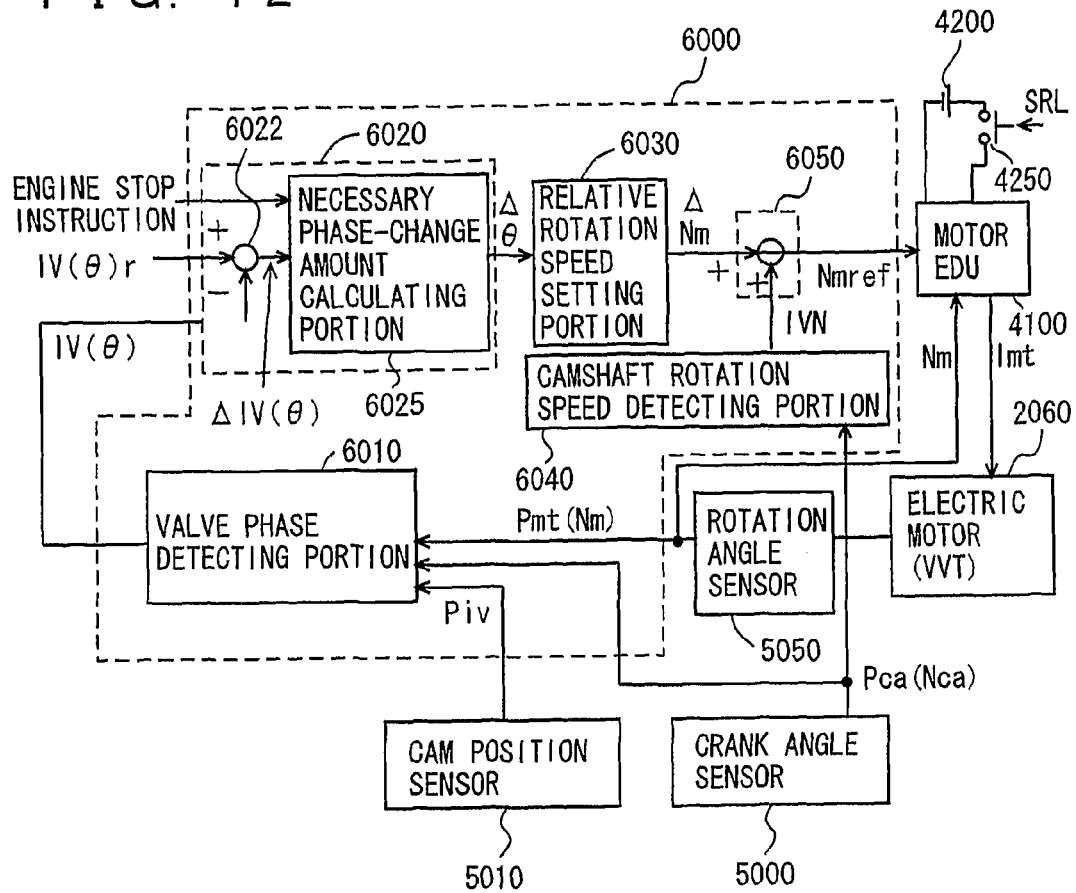
FIG. 12 is a block diagram illustrating rotation speed control of an electric motor as the actuator of the variable valve timing apparatus in accordance with the present embodiment.

FIG. 12 is a block diagram illustrating rotation speed control of electric motor 2060 as the actuator of intake VVT mechanism 2000 in accordance with the present embodiment.

Referring to FIG. 12, an actuator operation amount setting portion 6000 includes a valve phase detecting portion 6010, a camshaft phase-change amount calculating portion 6020, a relative rotation speed setting portion 6030, a camshaft rotation speed detecting portion 6040, and a rotation speed command generating portion 6050. The operation of actuator operation amount setting portion 6000 is realized by executing a control process in accordance with a prescribed program stored in advance in ECU 4000 at every prescribed control period.

Valve phase detecting portion 6010 calculates the current actual phase $IV(\theta)$ (hereinafter also denoted as actual intake valve phase $IV(\theta)$) of intake valve 1100, based on crank angle signal Pca from crank angle sensor 5000, cam angle signal Piv from cam position sensor 5010 and motor rotation angle signal Pmt from rotation angle sensor 5050 of electric motor 2060.

Based on crank angle signal Pca and cam angle signal Piv, at the time when cam angle signal Piv is generated, valve phase detecting portion 6010 converts time difference of cam angle signal Piv from the generation of crank angle signal Pca to rotation phase difference between crankshaft 1090 and intake camshaft 1120, whereby valve phase detecting portion 6010 calculates the current phase of intake camshaft 1120, that is, the actual intake valve phase $IV(\theta)$ (first phase calculating method).

Alternatively, in the intake VVT mechanism 2000 in accordance with the present embodiment, it is possible to accurately trace the phase-change amount of intake valve based on the operation amount (relative rotation speed $\Delta Nm$) of electric motor 2060 as the actuator. Specifically, based on the outputs of various sensors, the actual relative rotation speed $\Delta Nm$ is calculated, and by an operation in accordance with expression (1) based on the calculated actual relative rotation speed $\Delta Nm$, the amount of change $dIV(\theta)$ of the actual intake valve phase per unit time (control period) can be calculated. Therefore, valve phase detecting portion 6010 can successively calculate the current phase of intake camshaft 1120, that is, the intake valve phase, also by accumulating the amount of phase change $dIV(\theta)$ (second phase calculating method).

Considering the stability of engine speed, operation load or the like, and appropriately using the first and second phase calculating methods, valve phase detecting portion 6010 can detect intake valve phase $IV(\theta)$. By way of example, in a region where the engine speed is unstable, that is, in a region of relatively low speed of rotation (for example, rotation speed of 100 rpm or lower), the phase detection accuracy is ensured by the second phase detecting method described above, and in the region of high engine speed where the engine speed is stable and the interval of cam signal generation becomes shorter, phase detection is done in accordance with the first phase calculating method, whereby increase in operational load on ECU 4000 can be prevented.

Camshaft phase-change amount calculating portion 6020 has a calculating portion 6022 and a necessary phase-change amount calculating portion 6025. Calculating portion 6022 calculates deviation $\Delta IV(\theta)$ of the actual intake valve phase $IV(\theta)$ from the target phase $IV(\theta)r$ ($\Delta IV(\theta)=IV(\theta)-IV(\theta)r$). Necessary phase-change amount calculating portion 6025 calculates the necessary amount of change $\Delta\theta$ of intake camshaft 1120 of this control period, in accordance with the deviation $\Delta IV(\theta)$ calculated by calculating portion 6022.

By way of example, the maximum value $\Delta\theta max$ of phase-change amount $\Delta\theta$ in a single control period is set in advance, and necessary phase-change amount calculating portion 6025 determines the phase-change amount $\Delta\theta$ in accordance with the deviation $\Delta IV(\theta)$ within the range up to the maximum value $\Delta\theta max$. Here, the maximum value $\Delta\theta max$ may be a prescribed fixed value, or it may be variably set by necessary phase-change amount calculating portion 6025 in accordance with the state of operation (rotation speed, amount of intake air and the like) of engine 1000 or the magnitude of deviation $\Delta IV(\theta)$. Alternatively, camshaft phase change amount calculating portion 6020 may execute a convergence determination as to whether the intake valve phase $IV(\theta)$ has reached the target phase $IV(\theta)r$ or not, and when the phase has been converged, it sets the phase change amount $\Delta\theta=0$, as will be described in detail later.

Relative rotation speed setting portion 6030 calculates relative rotation speed $\Delta Nm$ of the output shaft of electric motor 2060 relative to the rotation speed of sprocket 2010 (intake camshaft 1120). By way of example, the relative rotation speed $\Delta Nm$ is set to a positive value ($\Delta Nm>0$) when the intake valve phase is to be advanced, set to a negative value ($\Delta Nm<0$) when the intake valve phase is to be retarded, and set to approximately zero ($\Delta Nm=0$) when the current intake valve phase is to be maintained ($\Delta\theta=0$).

Here, the relation between the phase-change amount $\Delta\theta$ per unit time $\Delta T$ corresponding to the control period and the relative rotation speed $\Delta Nm$ is represented by the following expression (1). In expression (1), $R(\theta)$ represents reduction gear ratio that changes in accordance with the intake valve phase, shown in FIG. 9.

$$\Delta\theta \propto \Delta Nm \cdot 360° \cdot (1/R(\theta)) \cdot \Delta T \qquad (1)$$

Therefore, relative rotation speed setting portion 6030 may calculate the relative rotation speed $\Delta Nm$ of electric motor 2060 for generating the camshaft phase-change amount $\Delta\theta$ required in control period $\Delta T$, in accordance with an operation of expression (1).

Camshaft rotation speed detecting portion 6040 calculates the rotation speed of sprocket 2010, that is, the actual rotation speed IVN of intake camshaft 1120 as one-half the rotation speed of crankshaft 1090. Camshaft rotation speed detecting portion 6040 may be configured to calculate the actual rotation speed IVN of intake camshaft 1120 based on the cam angle signal Piv from cam position sensor 5010. Generally, however, the number of cam angle signal output per one rotation of intake camshaft 1120 is smaller than the number of crank angle signal output per one rotation of crankshaft 1090. Therefore, by detecting the camshaft rotation speed IVN based on the rotation speed of crankshaft 1090, detection accuracy can be improved.

Rotation speed command generating portion 6050 adds the actual rotation speed IVN of intake camshaft 1120 detected by camshaft rotation speed detecting portion 6040 and the relative rotation speed $\Delta Nm$ set by relative rotation speed setting portion 6030, to generate rotation speed command value Nmref of electric motor 2060. The rotation speed command value Nmref generated by rotation speed command value generating portion 6050 is transmitted to motor EDU 4100.

Motor EDU 4100 is connected to a power source 4200 through a relay circuit 4250. On/off of relay circuit 4250 is controlled by a control signal SRL. Generally, power source 4200 is formed by a secondary battery that can be charged when the engine operates. Therefore, by continuously keeping on the relay circuit 4250 using timer (not shown) even after the engine is stopped, it is possible to operate electric motor 2060 as the actuator for a prescribed time period and to change the valve phase (that is, camshaft phase).

Motor EDU 4100 controls electric motor 2060 such that the rotation speed of electric motor 2060 matches the rotation speed command value Nmref. By way of example, motor EDU 4100 controls switching of a power semiconductor device (such as a transistor) such that the power supplied to electric motor 2060 (as represented by motor current Imt) is controlled in accordance with deviation in rotation speed (Nref−Nm) of actual rotation speed Nm of electric motor 2060 from the rotation speed command value Nmref. Specifically, the duty ratio of switching operation of such power semiconductor device is controlled.

Particularly, in order to improve motor controllability, motor EDU 4100 controls duty ratio DTY as the amount of adjustment in rotation speed control in accordance with the following equation (2).

$$DTY=DTY(ST)+DTY(FB) \quad (2)$$

In Equation (2), DTY(FB) is a feedback term based on the deviation in rotation speed mentioned above and a control operation (typically, general P control, PI control or the like) with a prescribed control gain.

In Equation (2), DTY(ST) is a preset term set based on the rotation speed command value Nmref of electric motor 2060 and the set relative rotation speed ΔNm.

Figure 13:
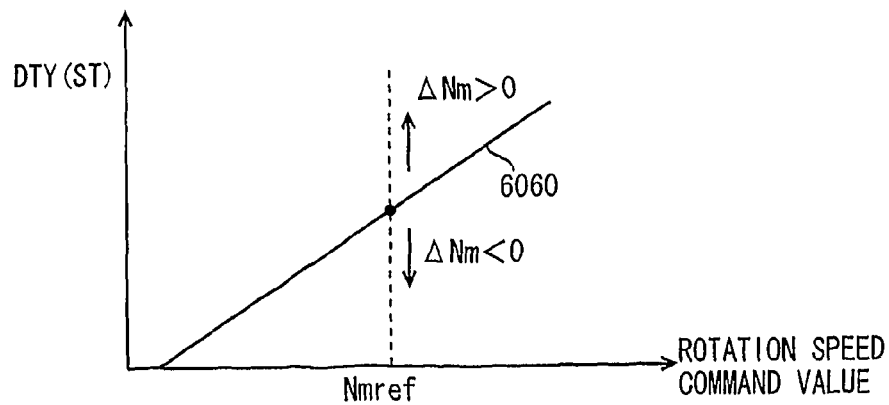
FIG. 13 is a schematic diagram representing speed control of the electric motor.

Referring to FIG. 13, duty ratio characteristic 6060 corresponding to the motor current value required when relative rotation speed ΔNm=0, that is, when electric motor 2060 is to be rotated at the same rotation speed as that of sprocket 2060 with respect to rotation speed command value Nmref (ΔNm=0), is set in advance as a table. Then, DTY(ST) in Equation (2) is set by relative addition/subtraction of a current value corresponding to the relative rotation speed ΔNm to/from the reference value in accordance with duty ratio characteristic 6060. By such rotation speed control that the power supply to electric motor 2060 is controlled by the combination of preset term and feedback term, motor EDU 4100 allows the rotation speed of electric motor 2060 to quickly follow any change in rotation speed command value Nmref, as compared with the rotation speed control simply by the term DTY(FB) of Equation (2).

(Intake Valve Phase Control when Engine is Stopped in Accordance with an Embodiment of the Present Invention)

Figure 14:
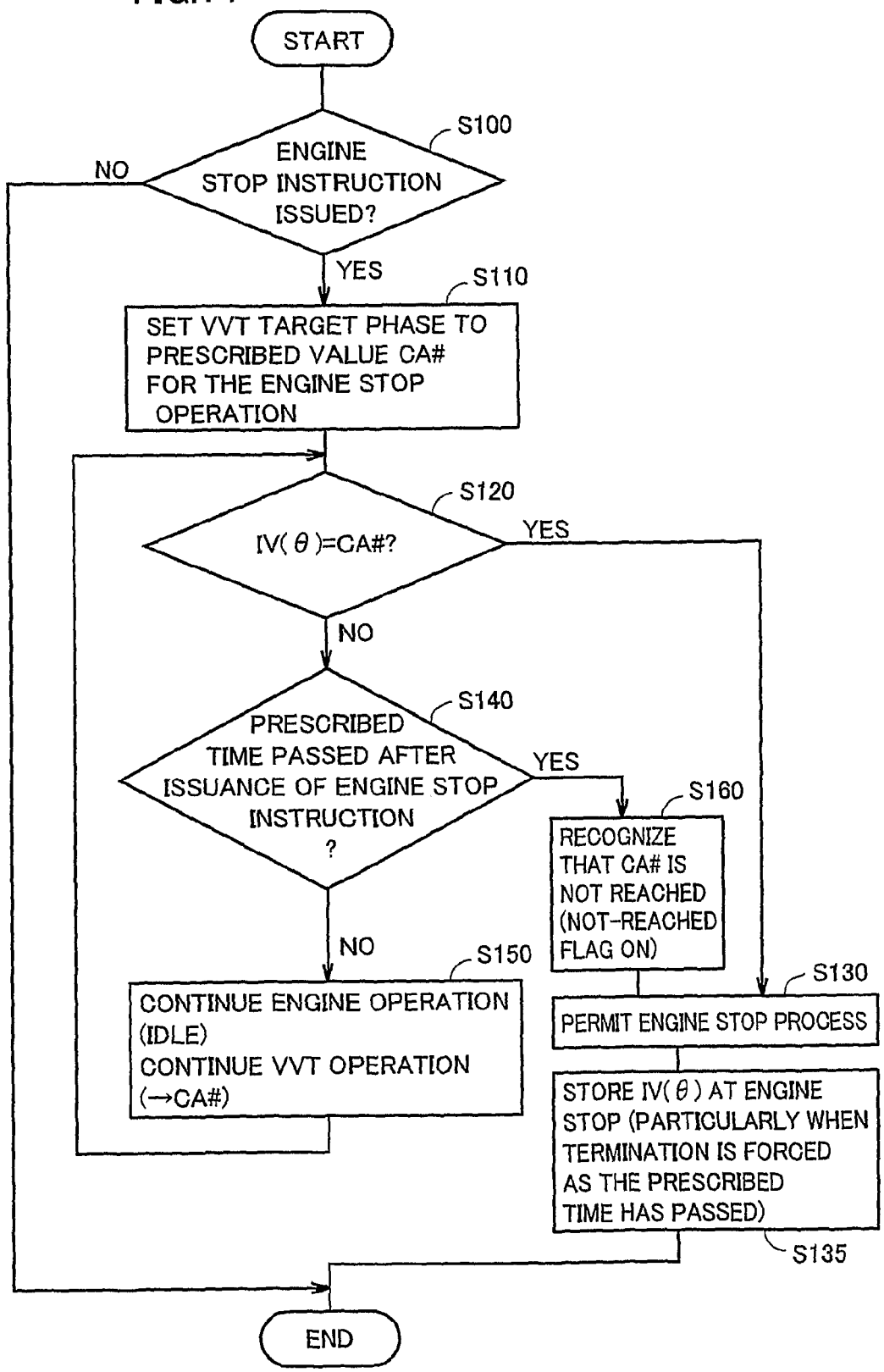
FIG. 14 is a flowchart representing control of intake valve phase when the engine is stopped, in the variable valve timing apparatus in accordance with an embodiment of the present invention.

FIG. 14 is a flowchart representing control of intake valve phase when the engine is stopped, in the variable valve timing apparatus in accordance with an embodiment of the present invention. The intake valve phase control when the engine is stopped (in the engine stop operation), in accordance with the flowchart of FIG. 14, can be realized by executing a prescribed program by ECU 4000. In this embodiment, the engine stop operation is started in response to an issuance of an engine stop instruction and ended at the time when the engine is fully stopped.

At step S100, ECU 4000 determines whether an engine stop instruction has been issued or not. The engine stop instruction is, typically, an off-operation of the ignition switch, as an engine stop instruction by the driver.

When the engine stop instruction is not issued (determination of NO at step S100), ECU 4000 terminates the process without executing the following steps.

When the engine stop instruction is generated (determination of YES at step S100), at step S110, ECU 4000 sets the target phase IV(θ)r of intake valve 1100 to the prescribed value CA# (FIG. 9) for the time when the engine is stopped. As already described, the target value CA# is set to a region where the reduction gear ratio of VVT mechanism 2000 as a whole is relatively large.

Further, at step S120, ECU 4000 determines whether or not the intake valve phase IV(θ) has reached the target value CA# in the engine stop operation. If the intake valve phase IV(θ) has reached the target value CA# (determination of YES at step S120), ECU 4000 permits the engine stop process at step S130.

When the engine stop process is permitted at step S130, the fuel injection and ignition operations at the engine are stopped by ECU 4000. Consequently, the engine speed gradually decreases and eventually the engine speed attains 0, whereby the engine is fully stopped. After the engine is fully stopped, when a prescribed time is passed or prescribed conditions are satisfied, power supply to each ECU is stopped, and the operation of VVT mechanism 2000 is also stopped.

If the intake valve phase IV(θ) has not yet reached the target value CA# (determination of NO at step S120), ECU 4000 determines whether a prescribed time has passed from the time of issuance of the engine stop instruction or not at step S140. Until after the lapse of the prescribed time period (determination of NO at step S140), ECU 4000 continues engine operation in an idle state at step S150 and continuously maintains the valve timing control operation by the VVT mechanism 2000, so that the intake valve phase IV(θ) changes to the target value CA#. Specifically, if the intake valve phase IV(θ) has not yet reached CA#, execution of the engine stop process is delayed within the prescribed time period determined at step S140, and step S150 is executed.

When the intake valve phase IV(θ) has reached CA#, ECU 4000 executes the engine stop process by execution of step S130, in response to determination of YES at step S120.

When the prescribed time period determined at step S140 has passed (determination of YES at step S140), ECU 4000 executes step S130 no matter whether intake valve phase IV(θ) has reached CA# or not. At step S160, ECU 4000 sets a not-reached flag ON, recognizing that the intake valve phase IV(θ) has not yet reached target value CA# when the engine operation was stopped. Further, following the process of step S160, ECU 4000 executes step S130 to permit the engine stop process, and at step S135, stores the final detection value detected by valve phase detecting portion 6010 (FIG. 12) at the time when engine operation was stopped (i.e., at the time point of engine stop), as the final intake valve phase, in a memory region of which stored contents are retained even when the power of ECU 400 is turned off. Consequently, even when the intake valve phase control should be terminated with the intake valve phase IV(θ) not yet reached CA# in response to the determination of YES at step S140, the actual intake valve phase at the time point of engine stop, that is, at the start of next engine operation, can be grasped.

Here, the prescribed time period used for the determination at step S140 corresponds to the period from the issuance of engine stop instruction to the maximum possible delay of engine stop process for controlling the intake valve phase. Therefore, the prescribed time period is set to an appropriate value (for example, about 1 to 2 seconds) so that the delay of operation stop process does not cause much uncomfortable feeling of the driver.

Figure 15:
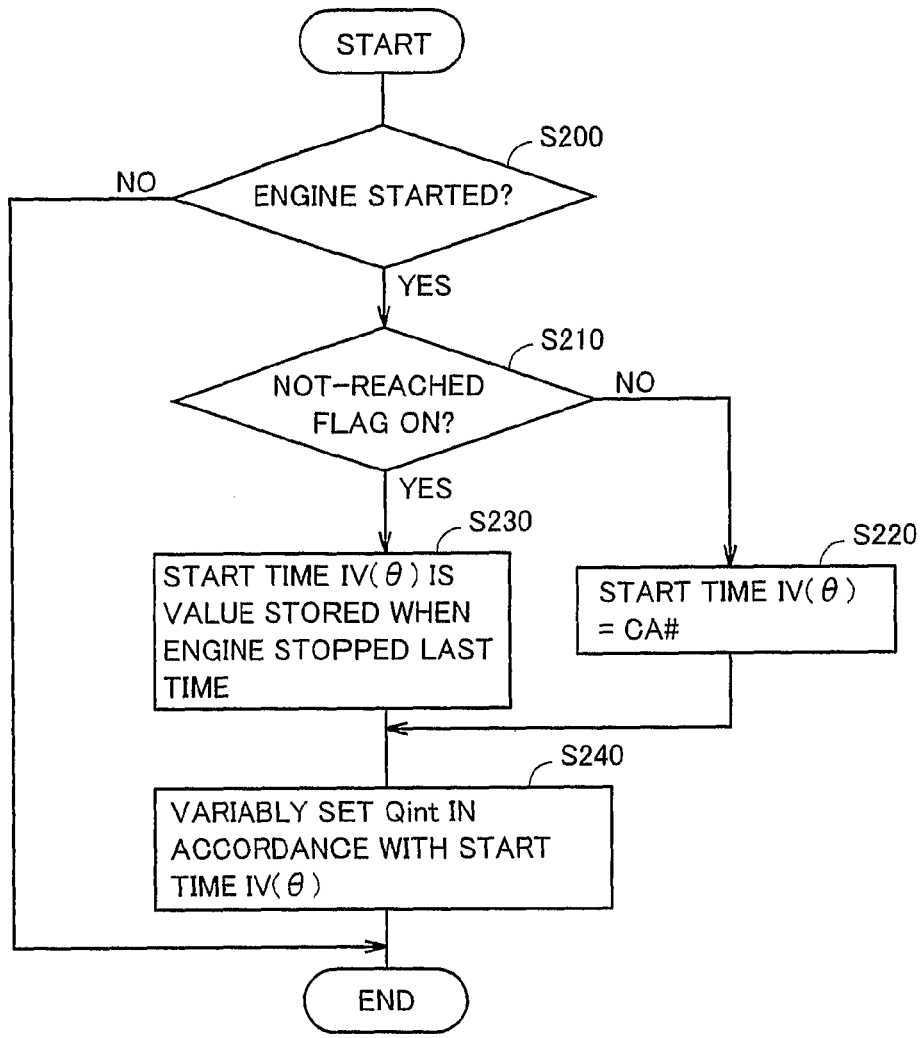
FIG. 15 is a flowchart representing a method of setting an amount of fuel injection at the start of an engine operation, corresponding to FIG. 14.

FIG. 15 shows a flowchart illustrating the procedure of setting an amount of fuel injection Qint at the start of engine operation, executed in an integrated manner with the process of FIG. 14. The control process in accordance with the flowchart of FIG. 15 is executed by ECU 4000.

Referring to FIG. 15, at step S200, ECU 4000 determines whether it is an engine start timing or not. If it is not the time of starting engine operation (determination of NO at step S200), the following process is not performed.

When it is the time of starting engine operation (determination of YES at step S200), ECU 4000 determines whether the not-reached flag, described with reference to step S160 of FIG. 14, is on or not, at step S210.

If the not-reached flag is off (determination of NO at step S210), the start time $IV(\theta)$, which is the intake valve phase at the start of operation, is recognized as the target value CA#, and if the not-reached flag is on (determination of YES at step S210), the start time $IV(\theta)$ is recognized in accordance with a memory value of step S135 shown in FIG. 4, given at the time the engine was stopped last time.

Then, at step S240, ECU 4000 variably sets the amount of fuel injection Qint at the start of operation, in accordance with the start time $IV(\theta)$, recognized at step S220 or S230.

Figure 16:
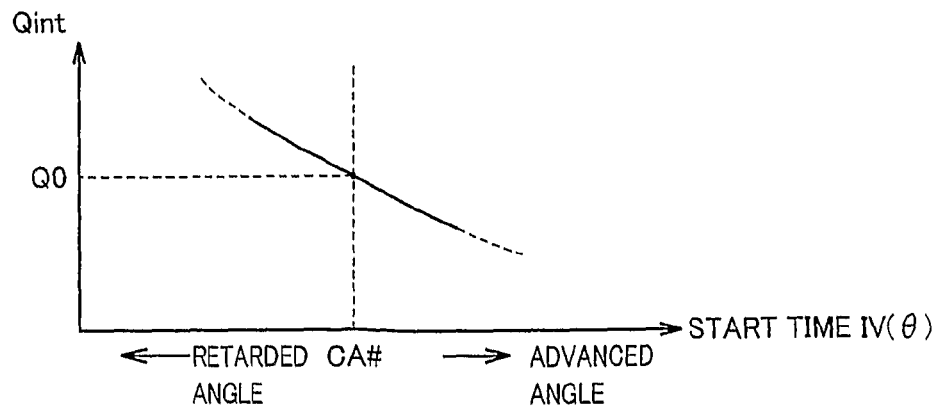
FIG. 16 schematically shows an exemplary setting of the amount of fuel injection at the start of an engine operation.

The amount of fuel injection Qint at the start of operation is set variably based on the start time $IV(\theta)$, as shown in FIG. 16. By way of example, if the determination is YES at step S140 of FIG. 14 and the engine has been stopped while the intake valve phase has not yet reached the target value CA#, the amount of fuel injection Qint at the start of operation is set in accordance with the intake valve phase $IV(\theta)$ (memory value) given at the time when the engine operation stopped last time.

By way of example, assuming that the reference amount of fuel injection when the intake valve phase $IV(\theta)$ is at the target value CA# is given as Q0, the amount of fuel injection is corrected such that the amount decreases as the intake valve phase is deviated to the advanced angle side and the amount increases as the intake valve phase is deviated to the retarded angle side.

The following control structure may also be available to set the amount of fuel injection Qint at the start of operation, in which if the not-reached flag is off (determination of NO at step S200), the amount of fuel injection at the start of operation is set to Qint=Q0, and if the not-reached flag is on (determination of YES at step S200), an amount of correction ΔQ is calculated based on the memory value and the amount of fuel injection at the start of operation is set to Qint=Q0+ΔQ.

As described above, according to the embodiments of the present invention, in a VVT mechanism 200 in which it is difficult to change the valve timing after the engine is stopped, the engine stop process may be delayed when the engine stop instruction is issued, so that valve timing can be controlled with the start timing (CA#) suitable for the next start of engine operation used as the target value. Further, after the lapse of a prescribed time period from the issuance of engine stop instruction, the engine stop process can be executed reliably. Therefore, sufficient amount of possible change in valve timing can be secured in the engine stop operation, without causing any uncomfortable feeling of the driver.

Further, even if the engine should be stopped with the intake valve phase not yet reached the target phase (CA#), the amount of fuel injection at the start of operation can be set appropriately, reflecting the deviation of intake valve phase, at the start of next engine operation. Thus, good starting characteristic of the engine is ensured.

Next, determination of convergence of the intake valve phase control in accordance with an embodiment of the present invention will be described.

The valve timing control when the engine is stopped does not have direct influence on the traveling performance, and it is for smoothing the start of next engine operation. Therefore, the required accuracy of phase control is not very high.

Figure 17:
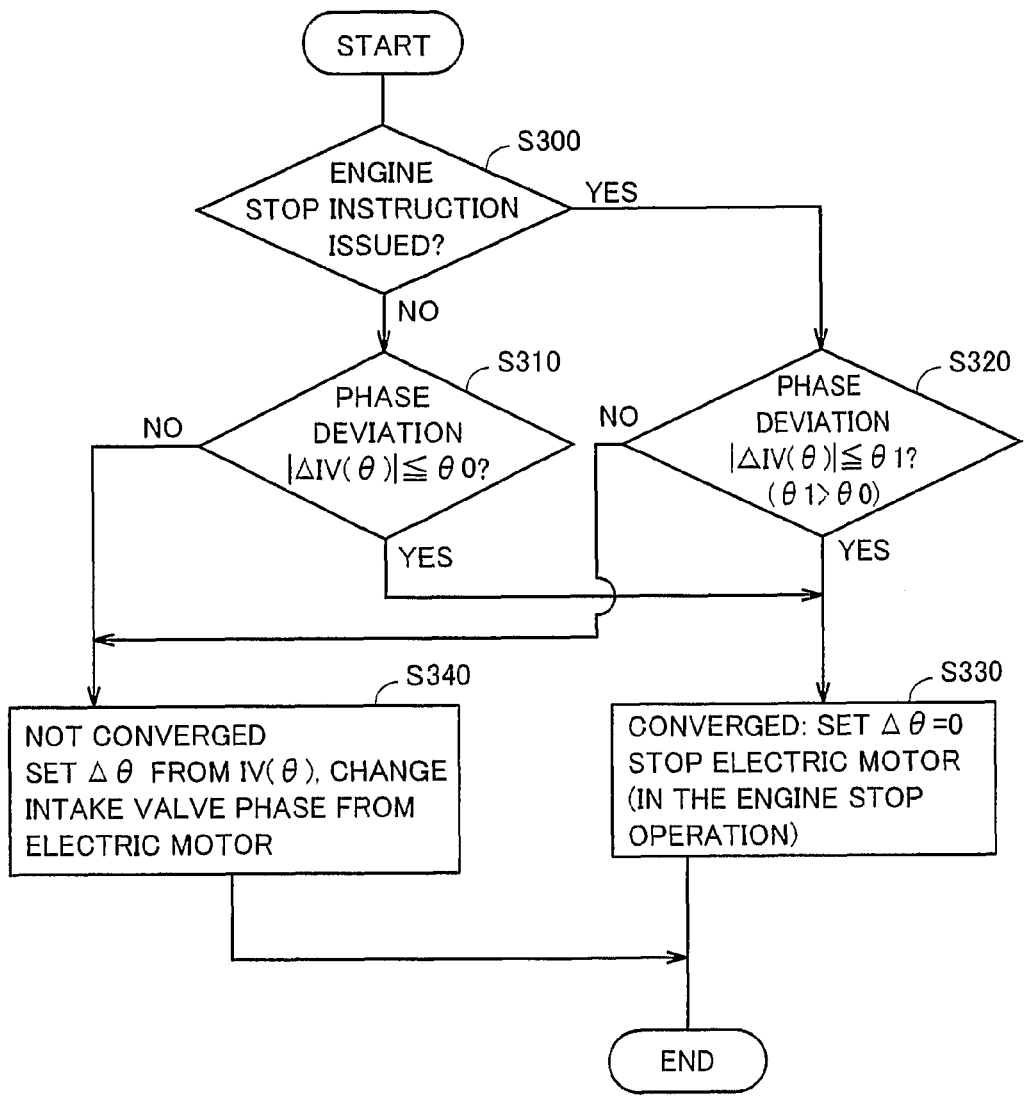
FIG. 17 is a flowchart representing determination of convergence of intake valve phase control in accordance with an embodiment of the present invention.

Therefore, a control structure may be adopted in which the convergence determination of intake valve phase control in the engine stop operation is made different from that at the normal operation (until the engine stop instruction is issued), as shown in FIG. 17.

FIG. 17 is a flowchart representing the convergence determination of intake valve phase control in accordance with an embodiment of the present invention. The convergence determination in accordance with the flowchart of FIG. 17 is executed by ECU 4000 as a part of valve timing control by intake VVT mechanism 2000.

Referring to FIG. 17, at step S300, ECU 4000 determines whether it is the intake valve phase control after the issuance of engine stop instruction, that is, in the engine stop operation or not, similar to step S100 (FIG. 14).

In the period before issuance of the engine stop instruction (while the determination at step S300 is NO), ECU 4000 performs convergence determination of the intake valve phase at step S310. At step S310, whether the absolute value $|\Delta IV(\theta)|$ of phase deviation $\Delta IV(\theta)$ to the target phase of intake valve phase $IV(\theta)$ is not higher than a determination value $\theta 0$ or not is determined.

After the issuance of engine stop instruction (determination of YES at step S300), ECU 4000 performs convergence determination of intake valve phase at step S320. At step S320, whether the absolute value $|\Delta IV(\theta)|$ of phase deviation $\Delta IV(\theta)$ to the target phase of intake valve phase $IV(\theta)$ is not higher than a determination value $\theta 1$ or not is determined. The convergence determination value $\theta 1$ in the engine stop operation is set larger than the convergence determination value $\theta 0$ for the normal mode. As a result, the required phase accuracy for the intake valve control in the engine stop operation becomes less strict than in the normal operation (before the issuance of engine stop instruction).

As to the determination at step S120 (FIG. 14), it is preferred to determine that the intake valve phase $IV(\theta)$ has reached the target value CA# when the condition $|IV(\theta)-CA\#|\leq\theta 1$ is satisfied, using the common determination value $\theta 1$.

If the result of convergence determination at step S310 or S320 is "YES", ECU 4000 determines at step S330 that the intake valve phase $IV(\theta)$ has reached the target phase, that is, the intake valve phase control has converged, and causes the necessary phase amount calculating portion 6025 (FIG. 12) to set the phase change amount $\Delta\theta$ to $\Delta\theta=0$. Consequently, the relative rotation number $\Delta Mn$ of electric motor 2060 that corresponds to the amount of operation of the actuator is set to $\Delta Mn=0$.

On the contrary, if the convergence determination at step S310 or S320 is "NO", ECU 4000 determines at step S340 that the intake valve phase $IV(\theta)$ has not yet reached the target phase, that is, the intake valve phase control has not yet converged, and causes the necessary phase amount calculating portion 6025 (FIG. 12) to set the phase change amount $\Delta\theta$ in accordance with the phase deviation $\Delta IV(\theta)$. Electric motor 2060 is operated in accordance with the phase change amount $\Delta\theta$ set in this manner, and therefore, the intake valve phase is further changed to the target phase.

As a result, in the intake valve phase control in the engine stop operation, after the intake valve phase IV(θ) reached the target phase CA#, electric motor 2060 as the actuator is stopped, whereby wasteful generation of electric power consumption can be prevented. Therefore, considering the difference in required accuracy when the engine is stopped and when the engine is in operation, the conditions for determining convergence of intake valve phase control can be relaxed in the engine stop operation, and the power consumption can further be reduced.

(Modification of Intake Valve Phase Control in the Engine Stop Operation)

Figure 18:
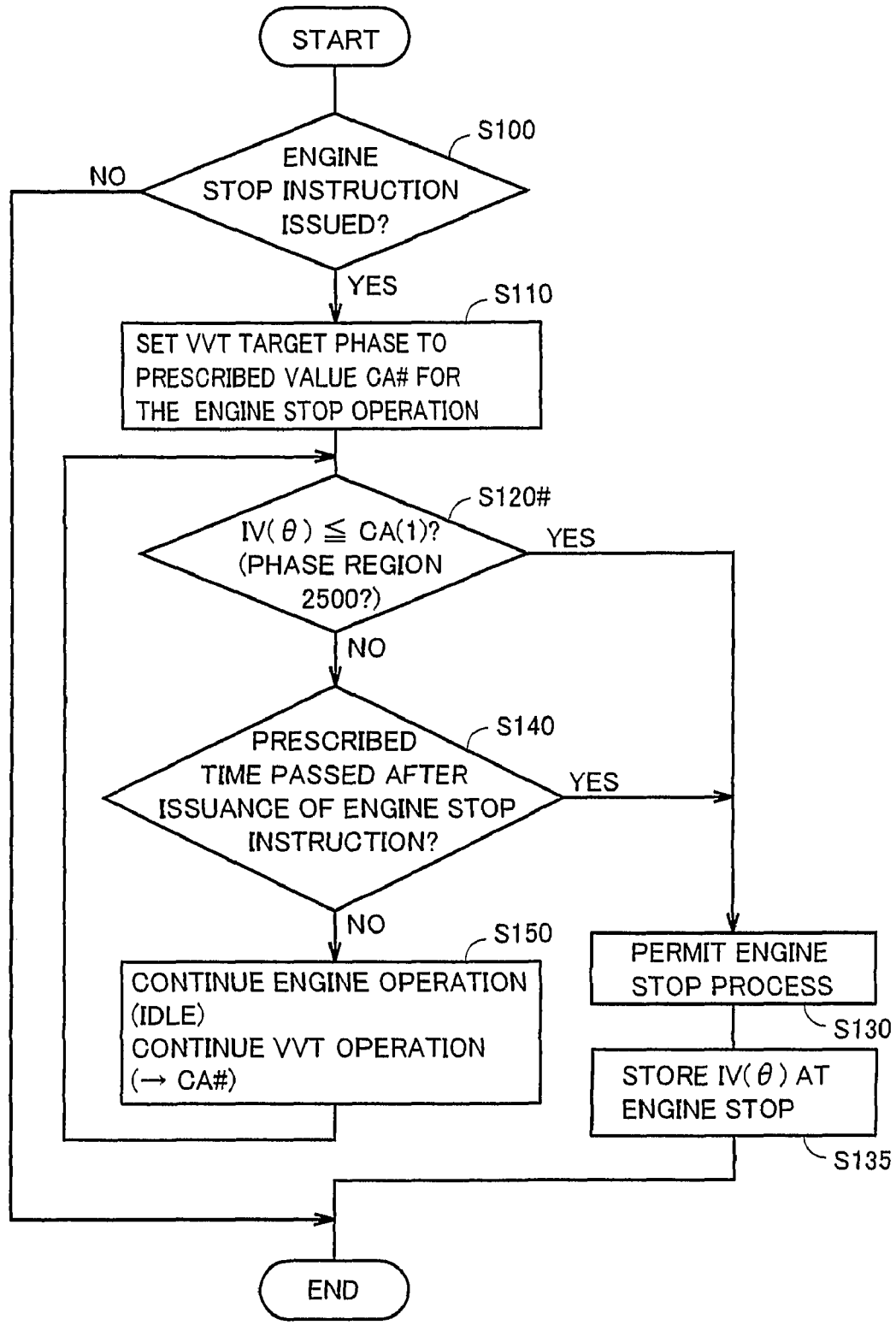
FIG. 18 is a flowchart representing a modification of intake valve phase control when the engine is stopped, in the variable valve timing apparatus in accordance with an embodiment of the present invention.

FIG. 18 is a flowchart representing a modification of intake valve phase control when the engine is stopped, in the variable valve timing apparatus in accordance with an embodiment of the present invention.

Referring to FIG. 18, in the intake valve phase control according to the modification, a step S120# is executed in place of step S120 of the flowchart shown in FIG. 14. Further, when the determination is YES at step S140 and at step S120#, step S130 for permitting the engine stop process is executed. Further, use of the not-reached flag may be omitted, and hence, process of step S160 of FIG. 14 may also be omitted.

At step S120#, ECU 4000 determines whether or not the intake valve phase IV(θ) is in the phase region 2500 with large reduction gear ratio of FIG. 9 (that is, IV(θ)≦CA(1): FIG. 9). As described with reference to FIG. 9, the target phase CA# is in the phase region 2500. In the phase region 2500, a large toque is required to rotate the output shaft of electric motor 2060 by the torque acting on intake camshaft 1120, and therefore, if the intake valve phase at the time point of engine stop is set within the phase region 2500, it is possible to prevent error in phase detection caused by fluctuation of the intake valve phase as the torque acting on intake camshaft 1120 changes. Therefore, in VVT mechanism 2000 in which the reduction gear ratio differs from one phase region to another, it is preferred that the intake valve phase is set within the phase region 2500 at the time point of engine stop.

While the intake valve phase IV(θ) has not yet reached the phase region 2500 of large reduction gear ratio (determination of NO at step S120#), ECU 4000 delays the engine stop process and continues intake valve phase control by VVT mechanism 2000, in the limited period from the issuance of engine stop instruction to the lapse of a prescribed time period, through the process of steps S140 and S150, as in the flowchart of FIG. 14.

When the intake valve phase IV(θ) is in phase region 2500 (determination of YES at step S120#) or when the prescribed time period has passed from the issuance of engine stop instruction even if the intake valve phase IV(θ) has not yet reached phase region 2500 (YES at step S140#), ECU 4000 permits execution of the engine stop process, at step S130.

At step S135, ECU 4000 stores the final value detected by valve phase detecting portion 6010 (FIG. 12) at the time when engine operation was stopped, as the final intake valve phase, in a memory region of which stored contents are not erased even when the power of ECU is turned off.

Figure 19:
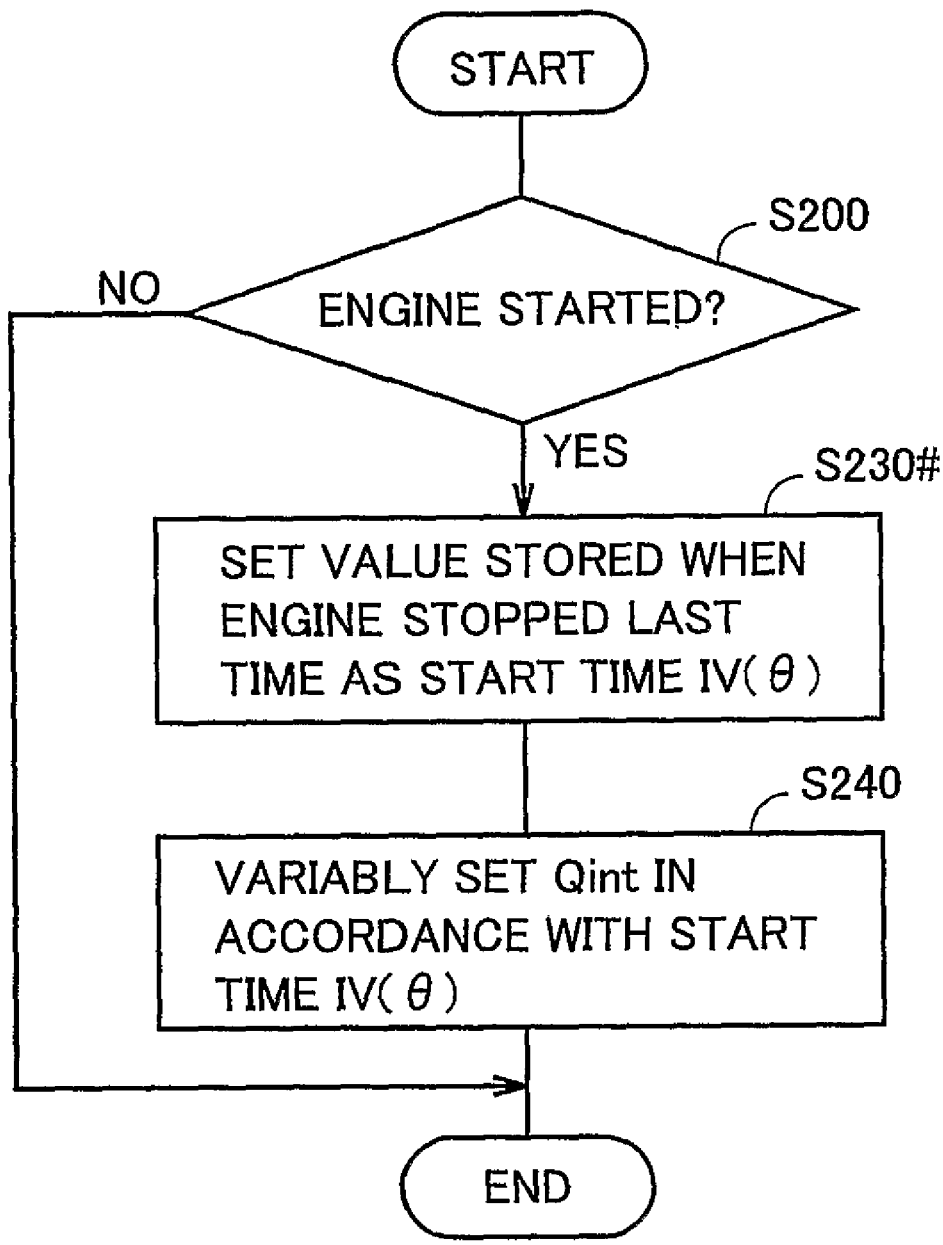
FIG. 19 is a flowchart representing a method of setting an amount of fuel injection at the start of an engine operation, corresponding to FIG. 18.

FIG. 19 shows a flowchart illustrating the procedure of setting an amount of fuel injection Qint at the start of engine operation, executed in an integrated manner with the process of FIG. 18. Similar to the process of FIG. 15, the control process in accordance with the flowchart of FIG. 18 is executed by ECU 400.

Referring to FIG. 19, at the start of engine operation (determination of YES at step S200), the ECU 4000 sets the intake valve phase IV(θ) stored at step S135 (FIG. 18) last time the engine was stopped as the start time IV(θ), at step S230#.

Further, at step S240, which is the same as that described with reference to FIG. 15, ECU 4000 variably sets the amount of fuel injection Qint at the start of operation, in accordance with the start time IV(θ). Consequently, even if the intake valve phase IV(θ) does not match target value CA#, the amount of fuel injection Qint at the start of operation can be set appropriately at the start of next engine operation, and good starting characteristic of the engine is ensured.

As described above, according to the embodiments of the present invention, in a VVT mechanism 2000 in which change in valve timing is difficult after the engine is stopped, the engine stop process may be delayed when the engine stop instruction is issued, so that intake valve timing control becomes possible to set the intake valve phase in the phase region 2500 of large reduction gear ratio. Further, after the lapse of a prescribed time period from the issuance of engine stop instruction, the engine stop process can be executed reliably. Therefore, sufficient amount of possible change in valve timing can be secured in the engine stop operation, without causing any uncomfortable feeling of the driver.

In the intake valve phase control shown in FIG. 18, if the intake valve phase is in the phase region 2500 of large reduction gear ratio where error in phase detection is less likely when the engine stops, the intake valve phase control may be terminated and the engine stop process may be started, even if the target phase CA# has not been reached. Therefore, as compared with the intake valve phase control shown in FIG. 14, the intake valve phase control in the engine stop operation can be terminated earlier to allow the engine stop process.

Further, even if the engine should be stopped with the intake valve phase not yet reaching the target phase (CA#), the amount of fuel injection at the start of operation can be set appropriately, reflecting the deviation of intake valve phase, at the start of next engine operation. Thus, good starting characteristic of the engine is ensured.

As a result, it becomes possible to terminate the intake valve phase control in the engine stop operation earlier to decrease power consumption, and to make smooth combustion at the start of next engine operation.

In the embodiments described above, VVT mechanism 2000 (FIGS. 3~9) corresponds to the "changing mechanism" of the present invention, step S110 (FIGS. 14, 18) corresponds to the "target value setting means" of the present invention, steps S120 (FIG. 14) and S120# (FIG. 18) correspond to the "determining means" of the present invention. Further, step S130 (FIGS. 14, 18) corresponds to the "stop permitting means" of the present invention, step S150 (FIGS. 14, 18) corresponds to the "stop process delaying means", and step S140 (FIGS. 14, 18) corresponds to the "termination forcing means" of the present invention.

Further, step S135 (FIGS. 14, 18) corresponds to the "storage means" of the present invention, and step S240 (FIGS. 14, 18) corresponds to the "means for setting fuel amount at the start of operation" of the present invention. Further, in FIG. 17, steps S310 and S320 correspond to the "first convergence determining means" and the "second convergence determining means", respectively, and step S340 corresponds to the "operation amount setting means" of the present invention.

Further, in the present embodiment, as the engine stop instruction of which presence is determined at step S100 (FIGS. 14, 18), an engine stop instruction by a driver (represented by an off-operation of an ignition switch) has been described. In a vehicle in which automatic engine stop control takes place such as a hybrid vehicle or a vehicle having a so-called eco-line system, however, such an automatic engine stop instruction may be included as the object of determination at step S100.

When the intake valve control in the time of engine stop operation in accordance with the present embodiment is executed in response to the engine stop instruction by the driver as well as to the engine stop instruction of automatic control as described above, the length of the prescribed time period determined at step S140 may be set variably, dependent on the type of engine stop instruction. By way of example, the prescribed time period in response to the engine stop instruction of automatic control may be set relatively longer than the engine stop instruction by the driver, so that the effect of ensuring sufficient amount of change in valve timing in valve timing control in the engine stop operation without causing much uncomfortable feeling of the driver can be attained more notably.

Similarly, as regards the convergence determination of intake valve phase control, as the engine stop instruction of which presence is determined at step S300 (FIG. 17), the engine stop instruction of automatic stop control of the engine described above may be included as the object of determination at step S100.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A variable valve timing apparatus for changing a timing of opening/closing at least one of an intake valve and an exhaust valve provided in an engine, comprising:
    an actuator;
    a changing mechanism configured to change the opening/closing timing, by changing difference in rotation phase of a camshaft driving the valve, of which opening/closing timing is to be changed, from rotation phase of a crankshaft by an amount of change in accordance with an operation amount of said actuator while said engine is in operation;
    target value setting means for setting, after issuance of an engine stop instruction, a target value of said opening/closing timing by said changing mechanism to a prescribed value;
    determining means for determining, after issuance of said engine stop instruction, whether current opening/closing timing of said valve has reached said prescribed value or not; stop permitting means for permitting, when it is determined by said determining means that the current opening/closing timing has reached said prescribed value, a process of stopping said engine;
    stop process delaying means for delaying, when it is not determined by said determining means that the current opening/closing timing has reached said prescribed value within a prescribed time period from issuance of said engine stop instruction, permission of the engine stop process;
    termination forcing means for forcing, after the lapse of said prescribed time period from issuance of said engine stop instruction, permission of the engine stop process by said stop permitting means, regardless of said current opening/closing timing;
    storage means for storing, at least when said engine stop process is permitted by said termination forcing means, said opening/closing timing at the time point of engine stop; and
    means for setting fuel injection amount at a start of operation for variably setting an amount of fuel injection of said engine based on contents stored in said storage means, when the engine is started next time.

2. The variable valve timing apparatus according to claim 1, wherein
    said actuator is implemented by an electric motor, and operation amount of said actuator is difference in rotation speed of said electric motor relative to the rotation speed of said camshaft.

3. The variable valve timing apparatus according to claim 1, wherein
    said changing mechanism is configured to change said opening/closing timing by a first amount of change with respect to the operation amount of said actuator when said opening/closing timing is in a first region, and to change said opening/closing timing by a second amount of change larger than said first amount of change with respect to the operation amount of said actuator when said opening/closing timing is in a second region different from said first region; and
    said first phase region is provided to include said prescribed value.

4. The variable valve timing apparatus according to claim 1, further comprising:
    first convergence determining means for setting; when deviation between said current opening/closing timing and said target value is not larger than a first determination value before issuance of said engine stop instruction, the amount of operation of said actuator to approximately zero;
    second convergence determining means for setting, when deviation between said current opening/closing timing and said target value is not larger than a second determination value larger than said first determination value, after issuance of said engine stop instruction, the amount of operation of said actuator to approximately zero; and
    operation amount setting means for setting, when the amount of operation of said actuator is not set to approximately zero by said first or second convergence determining means, the amount of operation of said actuator in accordance with deviation between said current opening/closing timing and said target value.

5. The variable valve timing apparatus according to claim 1, wherein
    said changing mechanism is configured to change said opening/closing timing by a first amount of change with respect to the operation amount of said actuator when said opening/closing timing is in a first region, and to change said opening/closing timing by a second amount of change larger than said first amount of change with respect to the operation amount of said actuator when said opening/closing timing is in a second region different from said first region;
    said prescribed value is set in said first phase region; and
    said determining means further determines whether the current opening/closing timing of said valve is within said first region or not after issuance of said engine stop instruction, and determines that said current opening/closing timing has reached said prescribed value also when it is determined that said current opening/closing timing is in said first region.

6. The variable valve timing apparatus according to claim 5, further comprising:
    storage means for storing said opening/closing timing at the time point of engine stop; and means for setting fuel injection amount at a start of operation for variably setting an amount of fuel injection of said engine based on contents stored in said storage means, when the engine is started next time.

7. A variable valve timing apparatus for changing a timing of opening/closing at least one of an intake valve and an exhaust valve provided in an engine, comprising:
   an actuator;
   a changing mechanism for changing the opening/closing timing, by changing difference in rotation phase of a camshaft driving the valve, of which opening/closing timing is to be changed, from rotation phase of a crankshaft by an amount of change in accordance with an operation amount of said actuator while said engine is in operation; and
   a controller; wherein
   said controller sets, after issuance of an engine stop instruction, a target value of said opening/closing timing by said changing mechanism to a prescribed value, and determines, after issuance of said engine stop instruction, whether current opening/closing timing of said valve has reached said prescribed value or not;
   said controller permits, when it is determined that the current opening/closing timing has reached said prescribed value, a process of stopping said engine, and delays, when it is determined that the current opening/closing timing has not yet reached said prescribed value and it is within a prescribed time period from issuance of said engine stop instruction, permission of the engine stop process; and
   said controller forces, after the lapse of said prescribed time period from issuance of said engine stop instruction, permission of said engine stop process, regardless of said current opening/closing timing, wherein
   said controller further stores, at least when permission of said engine stop process is forced, said opening/closing timing at the time point of engine stop, and variably sets, when the engine is started next time, an amount of fuel injection of said engine based on the stored opening/closing timing at the time point of engine stop.

8. The variable valve timing apparatus according to claim 7, wherein
   said changing mechanism is configured to change said opening/closing timing by a first amount of change with respect to the operation amount of said actuator when said opening/closing timing is in a first region, and to change said opening/closing timing by a second amount of change larger than said first amount of change with respect to the operation amount of said actuator when said opening/closing timing is in a second region different from said first region; and
   said controller provides said prescribed value in said first phase region.

9. The variable valve timing apparatus according to claim 7, wherein
   said controller sets, when deviation between said current opening/closing timing and said target value is not larger than a first determination value before issuance of said engine stop instruction, the amount of operation of said actuator to approximately zero, and sets, when deviation between said current opening/closing timing and said target value is not larger than a second determination value larger than said first determination value after issuance of said engine stop instruction, the amount of operation of said actuator to approximately zero; and
   said controller further sets, when the amount of operation of said actuator is not set to approximately zero, the amount of operation of said actuator in accordance with deviation between said current opening/closing timing and said target value.

10. The variable valve timing apparatus according to claim 7, wherein
    said changing mechanism is configured to change said opening/closing timing by a first amount of change with respect to the operation amount of said actuator when said opening/closing timing is in a first region, and to change said opening/closing timing by a second amount of change larger than said first amount of change with respect to the operation amount of said actuator when said opening/closing timing is in a second region different from said first region;
    said controller sets said prescribed value in said first phase region; and
    said controller further determines whether the current opening/closing timing of said valve is within said first region or not after issuance of said engine stop instruction, and determines that said current opening/closing timing has reached said prescribed value also when it is determined that said current opening/closing timing is in said first region.

11. The variable valve timing apparatus according to claim 10, wherein
    said controller further stores said opening/closing timing at the time point of engine stop, and variably sets an amount of fuel injection of said engine based on the stored contents, when the engine is started next time.

12. A method of controlling a variable valve timing apparatus for changing a timing of opening/closing at least one of an intake valve and an exhaust valve provided in an engine, wherein
    said variable valve timing apparatus includes
    an actuator; and
    a changing mechanism for changing the opening/closing timing, by changing difference in rotation phase of a camshaft driving the valve, of which opening/closing timing is to be changed, from rotation phase of a crankshaft by an amount of change in accordance with an operation amount of said actuator while said engine is in operation;
    said control method comprising the steps of:
    setting, after issuance of an engine stop instruction, a target value of said opening/closing timing by said changing mechanism to a prescribed value;
    determining, after issuance of said engine stop instruction, whether current opening/closing timing of said valve has reached said prescribed value or not;
    permitting, when it is determined at the step of determining that the current opening/closing timing has reached said prescribed value, a process of stopping said engine;
    delaying, when it is not determined at the step of determining that the current opening/closing timing has reached said prescribed value within a prescribed time period from issuance of said engine stop instruction, permission of the engine stop process; forcibly permitting, after the lapse of said prescribed time period from issuance of said engine stop instruction, the engine stop process, regardless of said current opening/closing timing
    storing, at least when said engine stop process is permitted at the step of forcibly permitting, said opening/closing timing at the time point of engine stop; and
    variably setting an amount of fuel injection of said engine based on contents stored at the step of storing, when the engine is started next time.

13. The method of controlling a variable valve timing apparatus according to claim 12, wherein
   said changing mechanism is configured to change said opening/closing timing by a first amount of change with respect to the operation amount of said actuator when said opening/closing timing is in a first region, and to change said opening/closing timing by a second amount of change larger than said first amount of change with respect to the operation amount of said actuator when said opening/closing timing is in a second region different from said first region; and
   said first phase region is provided to include said prescribed value.

14. The method of controlling a variable valve timing apparatus according to claim 12, further comprising the steps of:
   setting, when deviation between said current opening/closing timing and said target value is not larger than a first determination value before issuance of said engine stop instruction, the amount of operation of said actuator to approximately zero;
   setting, when deviation between said current opening/closing timing and said target value is not larger than a second determination value larger than said first determination value, after issuance of said engine stop instruction, the amount of operation of said actuator to approximately zero; and
   setting, when the amount of operation of said actuator is not set to approximately zero, the amount of operation of said actuator in accordance with deviation between said current opening/closing timing and said target value.

15. The method of controlling a variable valve timing apparatus according to claim 12, wherein
   said changing mechanism is configured to change said opening/closing timing by a first amount of change with respect to the operation amount of said actuator when said opening/closing timing is in a first region, and to change said opening/closing timing by a second amount of change larger than said first amount of change with respect to the operation amount of
   said actuator when said opening/closing timing is in a second region different from said first region;
   said prescribed value is set in said first phase region; and
   at the step of determining, whether the current opening/closing timing of said valve is within said first region or not after issuance of said engine stop instruction is further determined, and it is determined that said current opening/closing timing has reached said prescribed value also when it is determined that said current opening/closing timing is in said first region.

16. The method of controlling a variable valve timing apparatus according to claim 15, further comprising the steps of:
   storing said opening/closing timing at the time point of engine stop; and
   variably setting an amount of fuel injection of said engine based on contents stored at the step of storing, when the engine is started next time.

17. The method of controlling a variable valve timing apparatus according to claim 12, wherein
   said actuator is implemented by an electric motor, and operation amount of said actuator is difference in rotation speed of said electric motor relative to the rotation speed of said camshaft.

* * * * *